United States Patent
Mori et al.

(10) Patent No.: US 7,166,975 B2
(45) Date of Patent: Jan. 23, 2007

(54) APPARATUS AND METHOD FOR DRIVING THE MULTIPHASE MOTOR USING THE MAGNETIC POLE POSITION DETECTOR

(75) Inventors: Hideaki Mori, Nishinomiya (JP); Go Takata, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/355,800

(22) Filed: Feb. 16, 2006

(65) Prior Publication Data

US 2006/0197480 A1    Sep. 7, 2006

(30) Foreign Application Priority Data

Feb. 18, 2005    (JP) .............................. 2005-041923

(51) Int. Cl.
*H02P 6/02* (2006.01)
(52) U.S. Cl. ..................... 318/254; 318/138; 318/439
(58) Field of Classification Search ............... 318/254, 318/138, 439
See application file for complete search history.

(56) References Cited

U.S. PATENT DOCUMENTS

| | | | | |
|---|---|---|---|---|
| 4,495,450 A | * | 1/1985 | Tokizaki et al. ............ | 318/138 |
| 4,641,066 A | * | 2/1987 | Nagata et al. ............... | 318/254 |
| 4,912,378 A | * | 3/1990 | Vukosavic ................... | 318/254 |
| 4,922,169 A | * | 5/1990 | Freeman ...................... | 318/254 |
| 5,144,564 A | * | 9/1992 | Naidu et al. ................. | 318/721 |
| 5,204,593 A | * | 4/1993 | Ueki ........................... | 318/254 |
| 5,272,429 A | * | 12/1993 | Lipo et al. ................... | 318/808 |
| 5,481,166 A | * | 1/1996 | Moreira ....................... | 318/254 |
| 5,739,650 A | * | 4/1998 | Kimura et al. .............. | 318/254 |
| 5,869,944 A | * | 2/1999 | Tanina ......................... | 318/599 |

FOREIGN PATENT DOCUMENTS

JP    2000-253692    9/2000

* cited by examiner

*Primary Examiner*—Rita Leykin
(74) *Attorney, Agent, or Firm*—RatnerPrestia

(57) ABSTRACT

A motor driving apparatus includes a motor driver which includes a parallel circuit in which a plurality of series circuits are connected in parallel. Each of the plurality of series circuits has a high side switching device and a low side switching device connected in series. A voltage detector detects a voltage at a neutral point of the multiphase motor and outputs the detected voltage as a first detection signal. A timing detector detects a timing at which a voltage of the first detection signal equals to a reference voltage, and outputs the detected timing as a second detection signal which is used to generate a plurality of driving signals for driving switching devices in the parallel circuit.

25 Claims, 27 Drawing Sheets

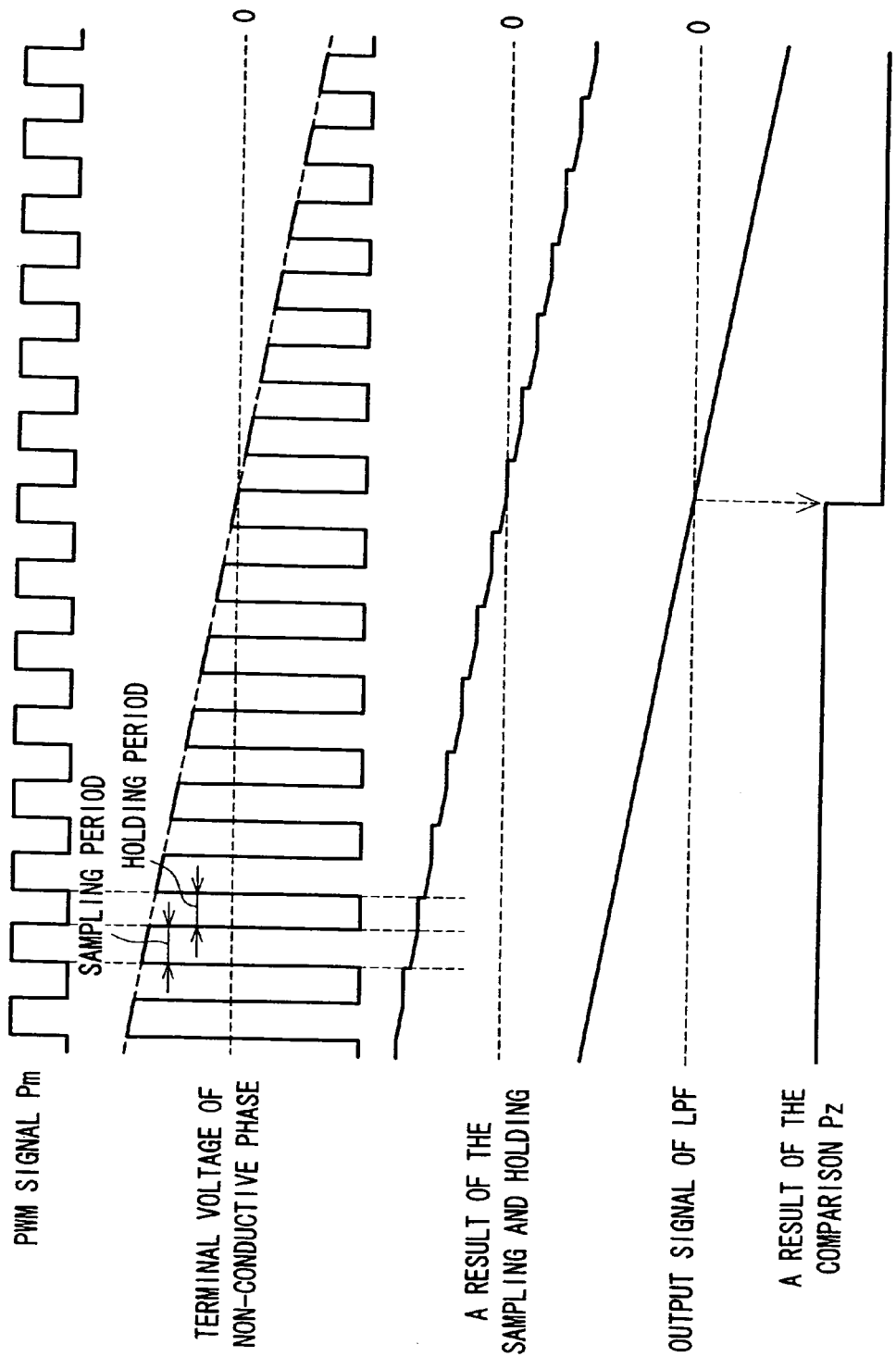

APPARATUS AND METHOD FOR DRIVING THE MULTIPHASE MOTOR USING THE MAGNETIC POLE POSITION DETECTOR

FIELD OF THE INVENTION

The present invention relates to apparatus and method for driving a multiphase motor, more particularly, to a detector for detecting a magnetic pole position of the multiphase motor by detecting a timing at when a neutral voltage of the multiphase motor equals to a reference voltage, an motor driving apparatus including the detector, and a method for driving the multiphase motor using the detector.

DESCRIPTION OF THE RELATED ART

Nowadays a brushless motor is generally used as a spindle motor to spindle a hard disc, an optical disc, and the like, as a fan motor of an air conditioner, and as a compressor driving motor of the air conditioner. The brushless motor is generally driven with pulse width modulation (referred to as "PWM") by an inverter, for the purpose of variable speed control in a wide range and reduction in power consumption. In the brushless motor having, for example, three phase coils, there are usually position sensors such as Hall elements arranged at electrical angle of 120-degree intervals, each of which detects a magnetic pole position of the rotor (magnet), that is, a rotating position of the rotor. In the brushless motor, switching devices constituting the inverter are driven based on a signal, by which the rotating position of the rotor is specified, output from each of the position sensors to drive the brushless motor by a substantially sinusoidal wave.

In the meanwhile, various sensorless drive techniques, each of which doesn't use any position sensor, are being developed for reduction in cost and size. As an example of method to achieve such a sensorless drive, there is a method for detecting a zero cross point of an induced voltage generated during a non-conducting period, with a 120-degree conduction or a wide angle (less than 180-degree) conduction. For instance, Japanese Laid-Open Patent Publication No. 2000-253692 discloses detecting the induced voltage generated during the non-conducting period for each phase of a multiphase motor by using a sample-and-hold circuit.

Hereinafter, it will now be briefly described with FIG. 29 and FIG. 30 about an invention described in Japanese Laid-Open Patent Publication No. 2000-253692. FIG. 29 shows an entire configuration of a conventional motor driving apparatus. The conventional motor driving apparatus 201 includes a power source 202, a three-phase motor 203 to be controlled, a motor driver 204, a current detector 205, a magnetic pole position detector 206, a conduction controller 207, a PWM signal generator 208, and a controller 209.

The motor driver 204, which consists of a three phase bridge, is switched in accordance with a conduction control signal sent from the conduction controller 207 to supply power from the power source 202 to each of three phase coils Lu, Lv, Lw of the three-phase motor 203. The current detector 205, which is connected between the motor driver 204 and ground, detects a current flowing through the whole motor driver 204 and outputs a result of the detection as a current detection signal to the PWM signal generator 208. The PWM signal generator 208 generates a PWM signal Pm based on the current detection signal and a control signal sent from the controller 209, and outputs the PWM signal Pm to the conduction controller 207. Thus, the three-phase motor 203 is driven with PWM. The magnetic pole position detector 206 detects a magnetic pole position of the three-phase motor 203 by sampling and holding a neutral voltage Vc of the three-phase motor 203 and each of three-phase terminal voltages Vu, Vv, Vw of the three-phase motor 203. Then, the magnetic pole position detector compares a signal obtained by sampling-and-holding the neutral voltage Vc with a signal obtained by sampling-and-holding each of terminal voltages Vu, Vv, Vw to detect the magnetic pole position of rotor, and outputs a result of the detection as a position detection signal to the conduction controller 207. The conduction controller 207 generates the conduction control signal based on the position detection signal, for the sensorless drive of the three-phase motor 203.

The magnetic pole position detector 206 includes resistors 301A to 301D, switches 302A to 302D, capacitors 303A and 303B, a comparator 305, and a switch selector 306. FIG. 30 shows a timing chart of an operation of each component of the magnetic pole position detector 206. The switch selector 306 selects, except the switch 302D, one switch to be turned on among three switches 302A–302D based on the conduction control signal output from the conduction controller 207, to select one among the three-phase terminal voltages Vu, Vv, Vw, with which the magnetic pole position is detected. The selected terminal voltage corresponds to a phase which is in a non-conductive state. The selected terminal voltage is sampled and held based on the PWM signal. In the sample-and-hold operation, the sampling is done during the on-period of the PWM signal, while the holding is done during the off-period of that (refer to FIG. 30). A LPF which consists of a resistor and a capacitor removes a step difference on a wave of the sampled and held voltage. The comparator 305 detects a zero cross point of an induced voltage at each phase coil Lu, Lv, Lw.

However, the conventional motor driving apparatus has the following problems. As described in Japanese Laid-Open Patent Publication No. 2000-253692, the conventional motor driving apparatus needs an existence of the non-conducting period in each of U-phase, V-phase and W-phase to detect the magnetic pole position of the three-phase motor 203. The existence of such non-conduction period causes vibration which results in the acoustic noise at the timing of switching an electrical conduction among three phases.

Further, the magnetic pole position detector 206 needs a switch and a capacitor for sampling-and-holding each terminal voltage and the neutral voltage, and also needs the switch selector 306 for selecting the neutral voltage Vc and one of three-phase terminal voltage Vu, Vv, Vw, to detect the magnetic pole position of the rotor. Thus, the magnetic pole position detector 206 becomes large in circuit dimension and also needs external components such as a capacitor in pluralities, which causes an increase in cost of the motor driving apparatus 201.

SUMMARY OF THE INVENTION

It is therefore an object of the present invention to provide a magnetic pole position detector with a simple configuration for detecting the magnetic pole position of the rotor without needing the existence of the non-conduction period in each phase, a motor driving apparatus capable of performing a sensorless drive with a substantially sinusoidal wave by using the magnetic pole position detector, and a motor driving method, which can reduce vibration and acoustic noise in order to solve the above noted problems.

A motor driving apparatus driving a multiphase motor according to the present invention includes:

a motor driver which includes a parallel circuit in which a plurality of series circuits are connected in parallel, each of the plurality of series circuits having a high side switching device and a low side switching device connected in series;

a voltage detector which detects a voltage at a neutral point of the multiphase motor during a first period and outputs the detected voltage as a first detection signal, the first period being identical to or a part of a period for which all of the high side switching devices or/and all of the low side switching devices are in an on state in the parallel circuit;

a first timing detector which detects a timing at which a voltage of the first detection signal equals to a first reference voltage, and outputs the detected timing as a second detection signal;

a periodic signal generator which generates a periodic signal whose phase is controlled based on the second detection signal; and a driving signal generator which generates, by using the periodic signal, a plurality of driving signals with each of which one of the high side and low side switching devices in the parallel circuit is driven.

According to such a motor driving apparatus, the detection of the magnetic pole position of the rotor that does not require the non-conducting period is realized with a simple configuration, thereby allowing a substantially sinusoidal wave sensorless drive that reduces vibration and acoustic noise caused by the presence of the non-conducting period. Moreover, according to the motor driving apparatus of the present invention, the manufacturing cost is reduced compared to the conventional motor driving apparatus since the detection of the magnetic pole position of the rotor is realized with a simple configuration.

A method of the present invention for driving a multiphase motor which comprises a motor driver including a parallel circuit in which a plurality of series circuits are connected in parallel, each of the plurality of series circuits having a high side switching device and a low side switching device connected in series, the method includes the steps of:

detecting a voltage at a neutral point of the multiphase motor during a period, and outputs the detected voltage as a first detection signal, the period being identical to or a part of a period for which all of the high side switching devices or/and all of the low side switching devices are in an on state in the parallel circuit;

detecting a timing at which a voltage of the first detection signal equals to a reference voltage and outputs the detected timing as a second detection signal;

generating a periodic signal whose phase is controlled based on the second detection signal; and generating, by using the periodic signal, a plurality of driving signals with each of which a corresponding one of the high side and low side switching devices of the parallel circuit is driven.

According to the driving method according to the present invention, since the non-conducting period is not necessary for the detection of the magnetic pole position of the rotor, vibration and acoustic noise caused by the presence of the non-conducting period are reduced.

A magnetic pole position detector for detecting a magnetic pole position of a multiphase motor of the present invention by detecting a timing at which a voltage at a neutral point of the multiphase motor equals to a reference voltage, the magnetic pole position detector includes:

a motor driver which includes a parallel circuit in which a plurality of series circuits are connected in parallel, each of the plurality of series circuits having a high side switching device and a low side switching device connected in series;

a voltage detector which detects the voltage at the neutral point of the multiphase motor during a period, and output a detected voltage as a detection signal, the period being identical to or a part of a period for which all of the high side switching devices or/and all of the low side switching devices are in an on state in the parallel circuit; and a timing detector which detects a timing at which a voltage of the detection signal equals to the reference voltage.

According to the magnetic pole position detector of the present invention, the detection of the magnetic pole position of the rotor that does not require the non-conducting period is realized with a simple configuration.

BRIEF DESCRIPTION OF THE DRAWINGS

Additional objects and advantages of the present invention will be apparent from the following detailed description of preferred embodiments thereof, which are best understood with reference to the accompanying drawings:

FIG. 30 is a timing chart of an operation of each component of a magnetic pole position detector shown in FIG. 29.

DETAILED DESCRIPTION OF THE PREFERRED EMBODIMENTS

The following is a detailed description of main embodiments of the invention, with reference to the drawings in which the same numerical references designate the corresponding elements throughout the different drawings.

Embodiment 1

A motor driving apparatus according to an embodiment 1 of the present invention drives a three-phase motor. The motor driving apparatus includes a parallel circuit in which three series circuits are connected in parallel. Each of the three series circuits includes a high side switching device and a low side switching device connected in series. The motor driving apparatus detects a magnetic pole position of a rotor by detecting a phase of an induced voltage generated by each of three phase coils of the three-phase motor. To detect the induced voltage corresponding to each phase, the motor driving apparatus samples a voltage at a neutral point of the three-phase motor in a predetermined period which is identical to or a part of a period in which all of the high side transistors or/and all of the low side transistors in the parallel circuit are in an on state, and generates a neutral voltage signal as a result of the sampling. Then, the motor driving apparatus detects a timing at which a voltage of the neutral voltage signal equals to a predetermined voltage such as a voltage at a zero cross point or a peak position of the neutral voltage signal, and generates a voltage timing signal as a result of the detection. Here, the neutral voltage signal corresponds to a third harmonic component contained in the induced voltage generated at each phase coil of the three-phase motor. Thus, a phase of the induced voltage generated at each phase coil can be detected based on the voltage timing signal. Generally, a motor is driven most efficiently when a phase of a current flowing through each phase coil equals to that of the induced voltage generated at the corresponding phase coil. Thus, the three-phase motor is efficiently driven when currents of U-phase, V-phase and W-phase are applied to the three-phase motor so that a phase of the current of each phase equals to that of the induced voltage of the same phase.

Figure 1:
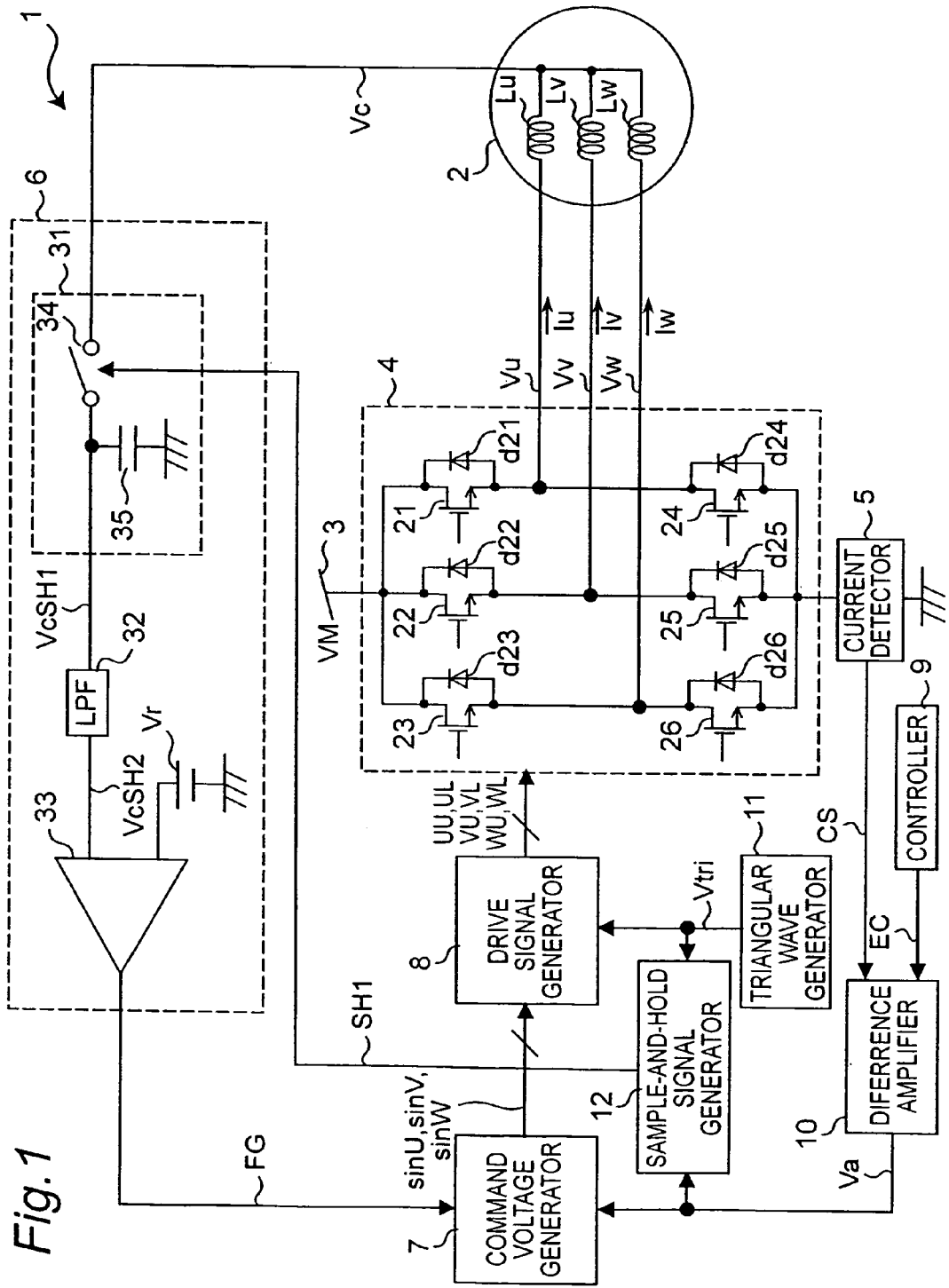
FIG. 1 is a circuit diagram of the entire configuration example of a motor driving apparatus according to an embodiment 1 of the present invention.

It will be described, with reference to FIGS. 1–10, about a motor driving apparatus and a motor driving method according to the embodiment 1 of the present invention. FIG. 1 shows a circuit diagram of the entire configuration example of a motor driving apparatus according to the embodiment 1. The motor driving apparatus 1 of the embodiment 1 drives the motor 2. As shown in FIG. 1, the motor driving apparatus 1 includes a power source 3, a motor driver 4, a current detector 5, a magnetic pole position detector (hereinafter referred to as "position detector") 6 of the motor 2, a command voltage generator 7, a drive signal generator 8, a controller 9, an difference amplifier 10, a triangular wave generator 11, and a sample-and-hold signal generator 12. The position detector 6 includes a sample-and-hold circuit 31, a low-pass filter (hereinafter referred to as "LPF") 32, a comparator 33, and a direct-current power source of a voltage Vr. The sample-and-hold circuit 31 includes a switch 34 and a capacitor 35. The current detector 5, the controller 9, the difference amplifier 10, the triangular wave generator 11, the sample-and-hold signal generator 12, the sample-and-hold circuit 31 and the low-pass filter 32 constitute a voltage detector. The sample-and-hold signal generator 12 and the sample-and-hold circuit 31 constitute a sample-and-hold unit. The comparator 33 constitutes a first timing detector. Further, the triangular wave generator 11 constitutes a carrier wave generator.

The motor 2 to be controlled consists of a rotor having field magnet which is a permanent magnet (not shown), and a stator in which the three phase coils Lu, Lv, Lw are Y-connected. The motor driver 4 is arranged between the power source 3, supplying a power source voltage of value VM, and ground. The motor driver 4 has a three-phase bridge which constitutes of power transistors 21 to 26. Each of the power transistors 21 to 26 performs a switching operation based on a signal level of one of drive signals UU, UL, VU, VL, WU, WL (hereinafter referred to simply as "UU etc.") output from the drive signal generator 8. The power transistors 21 to 26 supply power from the power source 3 to each phase coil Lu, Lv, Lw of the motor 2. The current detector 5 detects a value of a current flowing through the whole motor driver 4, and outputs a result of the detection as a current detection signal CS to the difference amplifier 10. The controller 9 outputs a torque command signal EC by which the torque to be applied to the motor 2 is specified. The difference amplifier 10 amplifies a difference between a value of a current to flow through the motor driver 4, derived from the torque command signal EC, and a current value indicated by the current detection signal CS, and outputs the amplified difference as an amplified signal Va to the command voltage generator 7 and the sample-and-hold signal generator 12. The command voltage generator 7 generates three phase voltages sinU, sinV, sinW (also called "three phase command voltages sinU, sinV, sinW") of sinusoidal waves based on a position detection signal FG sent from the position detector 6 to output them to the drive signal generator 8. The amplitude of each of the three phase command voltages sinU, sinV, sinW is controlled by the amplified signal Va. The drive signal generator 8 performs pulse width modulation on the three phase command voltages sinU, sinV, sinW with the triangular wave signal Vtri, which is sent from the triangular wave generator 11, to drive each of the power transistor 21 to 26 with PWM by the drive signals obtained through the pulse width modulation.

The amplified signal Va and the triangular wave signal Vtri are send to the sample-and-hold signal generator 12. The sample-and-hold signal generator 12 generates a timing pulse which indicates a period at when all of the phase power transistors 24 to 26, which constitute a lower side arm of the motor driver 4, are in an on state, and outputs the timing pulse to the position detector 6 as a sample-and-hold signal SH1. The position detector 6 samples and holds the neutral voltage Vc of the motor 2 based on the signal level of the sample-and-hold signal SH1 to detect the magnetic pole position of the rotor, that is, the phase of the induced voltage generated at each phase. The position detector 6 then outputs a result of the detection as the position detection signal FG to the command voltage generator 7. In the motor driving apparatus 1 configured as above, the position detector 6 detects the magnetic pole position of the rotor, the command voltage generator 7 generates the three phase command voltages of sinusoidal waves whose phases correspond to the detected magnetic pole position, and the drive signal generator 8 generates the drive signals by using the three phase command voltages so that the motor driver 4 is driven with PWM sensorless.

Figure 2:
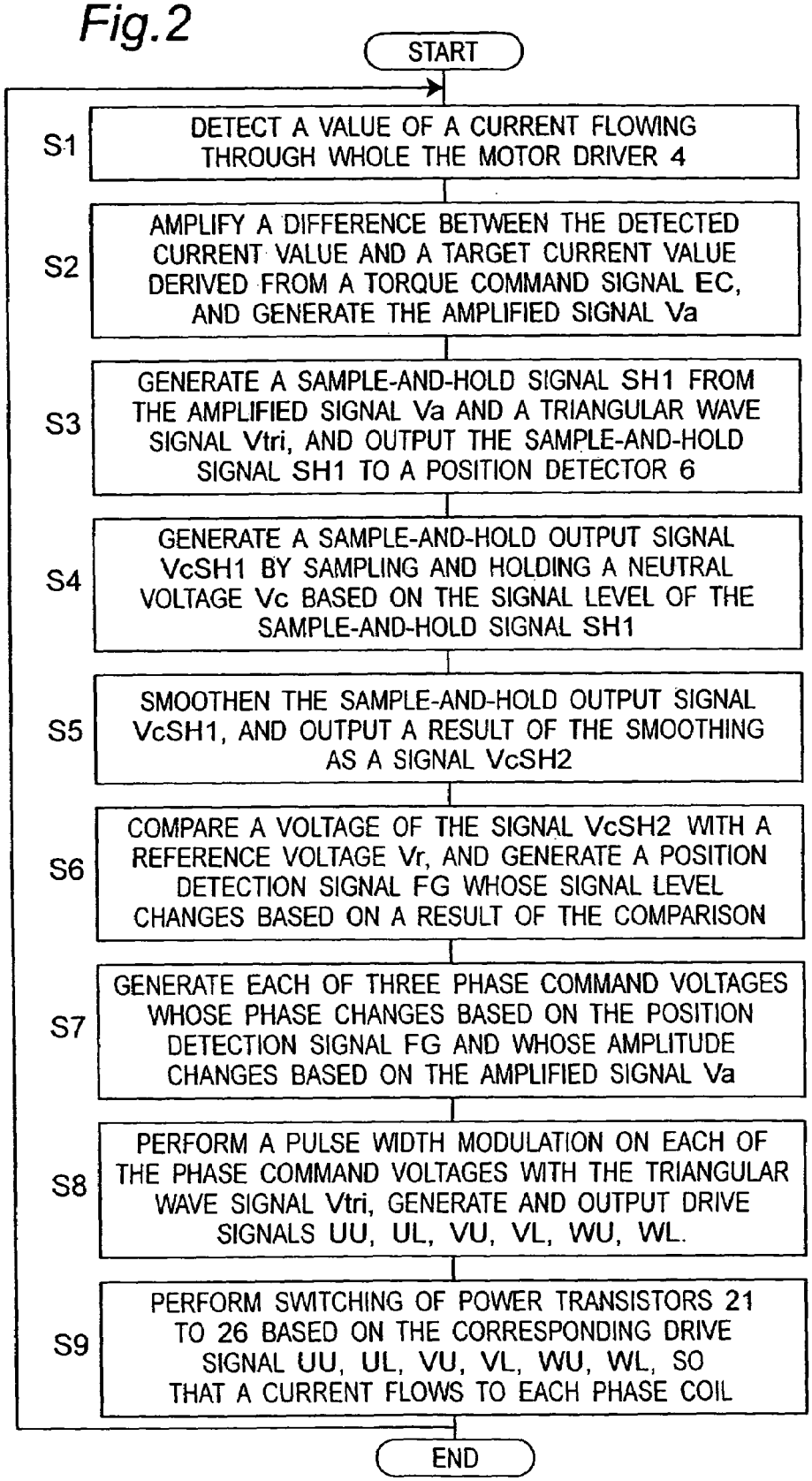
FIG. 2 is a flow chart of a method for driving a motor 2 with a motor driving apparatus 1.

FIG. 2 shows a flow chart of a method for driving the motor 2 with the motor driving apparatus 1. As shown in FIG. 2, first, the current detector 5 detects the value of the current flowing through whole the motor driver 4 (step S1). The difference amplifier 10 amplifies a difference between the detected current value and a target current value derived from the torque command signal EC, and generates the amplified signal Va (step S2) The sample-and-hold signal generator 12 generates the sample-and-hold signal SH1 from the amplified signal Va and the triangular wave signal Vtri, and outputs the sample-and-hold signal SH1 to the position detector 6 (step S3). The position detector 6 generates a sample-and-hold output signal VcSH1 by sampling and holding the neutral voltage Vc based on the signal level of the sample-and-hold signal SH1 (step S4). Thereafter, the LPF 32 extracts only a predetermined frequency band of the sample-and-hold output signal VcSH1 to smoothen it, and outputs a result of the smoothing as a signal VcSH2 (step S5). Then, the comparator 33 compares the voltage of the signal VcSH2 with the reference voltage Vr, and generates a position detection signal FG whose signal level changes based on a result of the comparison to output the position detection signal FG to the command voltage generator 7 (step S6). The command voltage generator 7 generates each of the three phase command voltages whose phase changes based on the position detection signal FG and whose amplitude changes based on the amplified signal Va, and outputs the same to the drive signal generator 8 (step S7). Then, the drive signal generator 8 performs a pulse width modulation on each of the phase command voltages with the triangular wave signal Vtri, generates and outputs the drive signal UU etc. to the motor driver 4 (step S8). Each of the power transistors 21 to 26 is switched on/off based on the corresponding drive signal UU etc. so that a predetermined current flows to each phase coil (step S9). The process returns again to step S1 while the motor 2 is driven by the motor driving apparatus 1, and subsequently, the steps 2–9 are operated as described above.

It will be described in detail about an operation of each component of the motor driving apparatus according to the embodiment 1. The motor driver 4 consists of six power transistors 21 to 26 connected so as to form a bridging connection, and six power diodes d21 to d26, each of which is back-to-back connected to the corresponding power transistor 21 to 26. In this motor driver 4, two power transistors 21 and 24 are connected in series, and one end of the coil Lu is connected to a point at which the two power transistors 21 and 24 are connected. Also, the power transistors 22 and 25 are connected in series, and one end of the coil Lv is connected to a point at which the two power transistors 22 and 25 are connected. Further, the power transistors 23 and 26 are connected in series, and one end of the coil Lw is connected to a point at which the power transistors 23 and 26 are connected. Each of the power transistors 21 to 26 performs an on/off switching operation based on a signal level of the corresponding drive signal W etc. output from the drive signal generator 8, to supply power from the power source 3 to each phase coil Lu, Lv, Lw of the motor 2. The motor 2 is driven with PWM by the on/off switching of the power transistors 21 to 26.

The motor driver 4 may have a configuration either in which each of the power transistors 21 to 26 is a N-channel field effect transistor, or in which each of the power transistors 21 to 23 constituting an upper side arm and each of the power transistors 24 to 26 constituting a lower side arm is a N-channel field effect transistor and a P-channel field effect transistor, respectively. Further, the motor driver 4 may consist of bipolar junction transistors (BJTs) or insulated gate bipolar transistors (IGBTs), instead of the field effect transistors. In addition, the power diodes d21 to d26 may be replaced with parasitic diodes structurally existing in power transistors 21 to 26.

The current detector 5 is arranged between the motor driver 4 and the ground. The current detector 5 consists of, for example, a resistor for detecting a current, and a LPF. Being configured as described above, the current detector 5 can detect an average current flowing through the motor driver 4 as a D.C. voltage. The controller 9 outputs the torque command signal EC. There is no restriction on the configuration of the controller 9, and therefore, the controller 9 may consist of a microcomputer or a hardware component. The difference amplifier 10 amplifies a difference between a voltage of the current detection signal CS and a voltage of the torque command signal EC, to output a result of the amplification to the command voltage generator 7 as an amplified signal Va. The difference amplifier 10 also outputs the amplified signal Va to the sample-and-hold signal generator 12. Hereinafter, it will be described about a detailed operation of the sample-and-hold signal generator 12.

The command voltage generator 7 generates the three phase command voltages sinU, sinV, sinW based on the position detection signal FG sent from the position detector 6. Hereinafter, it will be described about a detailed operation of the position detector 6. Each of the three phase command voltages sinU, sinV, sinW, among which there is a phase difference of 120 degrees, has a waveform of 180-degree electrical conduction pattern. Further, as far as the motor driving apparatus 1, each of the three phase command voltages sinU, sinV, sinW has a waveform of sinusoidal wave. Specifically, the command voltage generator 7 detects a zero cross point of each of the three phase induced voltages from the position detection signal FG to detect 0-degree phase and 180-degree phase of each phase induced voltage. The zero cross points are detected at an interval of a phase of 60 degrees of one of the three phase induced voltages. Then, the command voltage generator 7 generates the three phase command voltages sinU, sinV, sinW, so that a phase of a current flowing through each of the three phase coils equals to that of the corresponding phase induced voltage. An example of a method for generating the three phase command voltages from the position detection signal FG is measuring the period of the position detection signal FG, obtaining angular information based on a result of the measurement, and outputting the voltage value corresponding to the angular information. Specifically, the command voltage generator 7 calculates the time (T/120 in FIG. 10) necessary for a phase of each of the three phase induced voltages Eu, Ev, Ew to change by one degree, from a pulse period T of the position detection signal FG and an amount of change in a phase (120 degrees in FIG. 10) of each induced voltage Eu, Ev, Ew in one period. Then, using a timing at which a signal level of the position detection signal FG changes from high (H) to low (L), and a time (T/120) derived from the above calculation, the command voltage generator 7 generates and outputs each phase command voltage sinU, sinV, sinW which is the same in phase as the corresponding phase induced voltage Eu, Ev, Ew, so that the current Iu, Iv, Iw flowing through each phase coil is the same in phase as the corresponding phase induced voltage Eu, Ev, Ew. (That is, phase command voltage sinU, sinV, sinW correspond to the induced voltages Eu, Ev, Ew, respectively. Further, current Iu, Iv, Iw correspond to the induced voltages Eu, Ev, Ew, respectively.) Here, a point at which the signal level of the position detection signal FG changes from high (H) to low (L) equals to a zero cross point corresponding to 0-degree phase of a signal VcSH1. Further, in consideration of the fact that the phase of the current Iu, Iv, Iw flowing through each phase coil is delayed from the phase of the corresponding phase command voltage sinU, sinV, sinW, the phase of each phase command voltage sinU, sinV, sinW may be generated so as to be shifted by a predetermined amount in advance. The sinusoidal wave-shaped signal is not limited to a signal having a waveform of a complete sinusoidal wave and also includes a signal having a waveform of a substantial sinusoidal wave. The method for generating the three phase command voltage is not limited to the above and only needs to be a method in which the three phase command voltages are generated based on the position detection signal FG. The amplitude of the three phase command voltages sinU, sinV, sinW is controlled by the amplified signal Va. If the amplified signal Va is large (i.e., the difference between the torque command signal EC and the current detection signal CS is large), the amplitude of the three phase command voltages sinU, sinV, sinW is made large, while if the amplified signal Va is small (i.e., the difference between the torque command signal EC and the current detection signal CS is small), the amplitude is made small. The three phase command voltages sinU, sinV, sinW generated in such way are sent to the drive signal generator 8.

The drive signal generator 8 performs pulse width modulation on the three phase command voltages sinU, sinV, sinW with the triangular wave signal Vtri sent from the triangular wave generator 11 to generate the drive signal UU etc. to drive each of the power transistors 21 to 26 with PWM, and output them to the motor driver 4.

Figure 3:
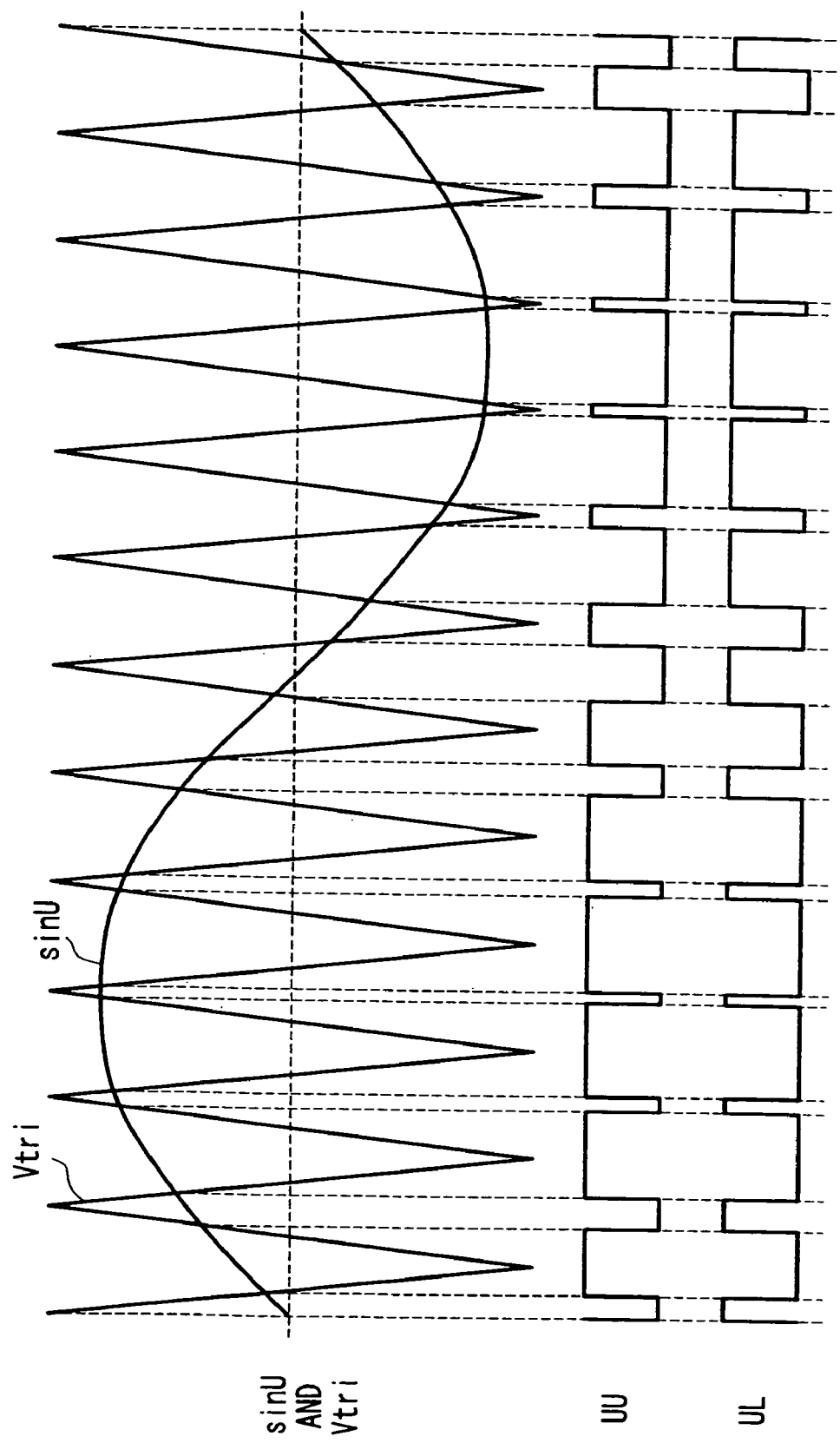
FIG. 3 is a timing chart for explaining an operation of a drive signal generator 8.

FIG. 3 shows a timing chart (only U phase) explaining the operation of the drive signal generator 8. In FIG. 3, it is shown about a relationship of the U-phase command voltage sinU generated by the command voltage generator 7, the triangular wave signal Vtri generated by the triangular wave generator 11, the U-phase upper side drive signal UU generated when the U-phase command voltage sinU is subjected to pulse width modulation (PWM), and the U-phase lower side drive signal UL generated when the U-phase command voltage sinU is subjected to PWM. The U-phase command voltage sinU generated by the command voltage generator 7 is subjected to PWM by the triangular wave signal Vtri. The U-phase upper side drive signal UU and the U-phase lower side drive signal UL generated through PWM are signals for controlling the gate of the U-phase upper side power transistor 21 and the gate of the U-phase lower side power transistor 24, respectively. If the U-phase command voltage sinU is larger than a voltage of the triangular wave signal Vtri, the U-phase upper side drive signal UU becomes "H" level and the U-phase lower side drive signal UL becomes "L" level, and thus the U-phase upper side power transistor 21 is turned on and the U-phase lower side power transistor 24 is turned off. On the other hand, if the U-phase command voltage sinU is smaller than the voltage of the triangular wave signal Vtri, the U-phase lower side drive signal UL becomes "H" level and the U-phase upper side drive signal W becomes "L" level, and thus the U-phase lower side power transistor 24 is turned on and the U-phase upper side power transistor 21 is turned off. As described above, in the motor driving apparatus 1 according to the embodiment 1, the command voltage generator 7 generates each of the three phase command voltages as a sinusoidal wave-shape voltage, the drive signal generator 8 performs PWM on each of the three phase command voltages to obtain a drive signal, and each power transistor 21 to 26 of the motor driver 4 is driven with PWM by each of the drive signals. Thus, the motor 2 can be driven with a substantially sinusoidal wave. The frequency of the three phase command voltages sinU, sinV, sinW output from the command voltage generator 7 is about a few Hz to 1 kHz, and the frequency of the triangular wave signal Vtri is about 20 kHz to 100 kHz.

It will be described in detail about the sample-and-hold signal generator 12. The sample-and-hold signal generator 12 generates a timing pulse which indicates a period in which all of the power transistors 24 to 26 constitutes the lower side arm of the motor driver 4 are in an on state, and outputs the same as the sample-and-hold signal SH1 to the position detector 6. First, the sample-and-hold signal SH1 will be explained with reference to FIG. 4.

Figure 4:
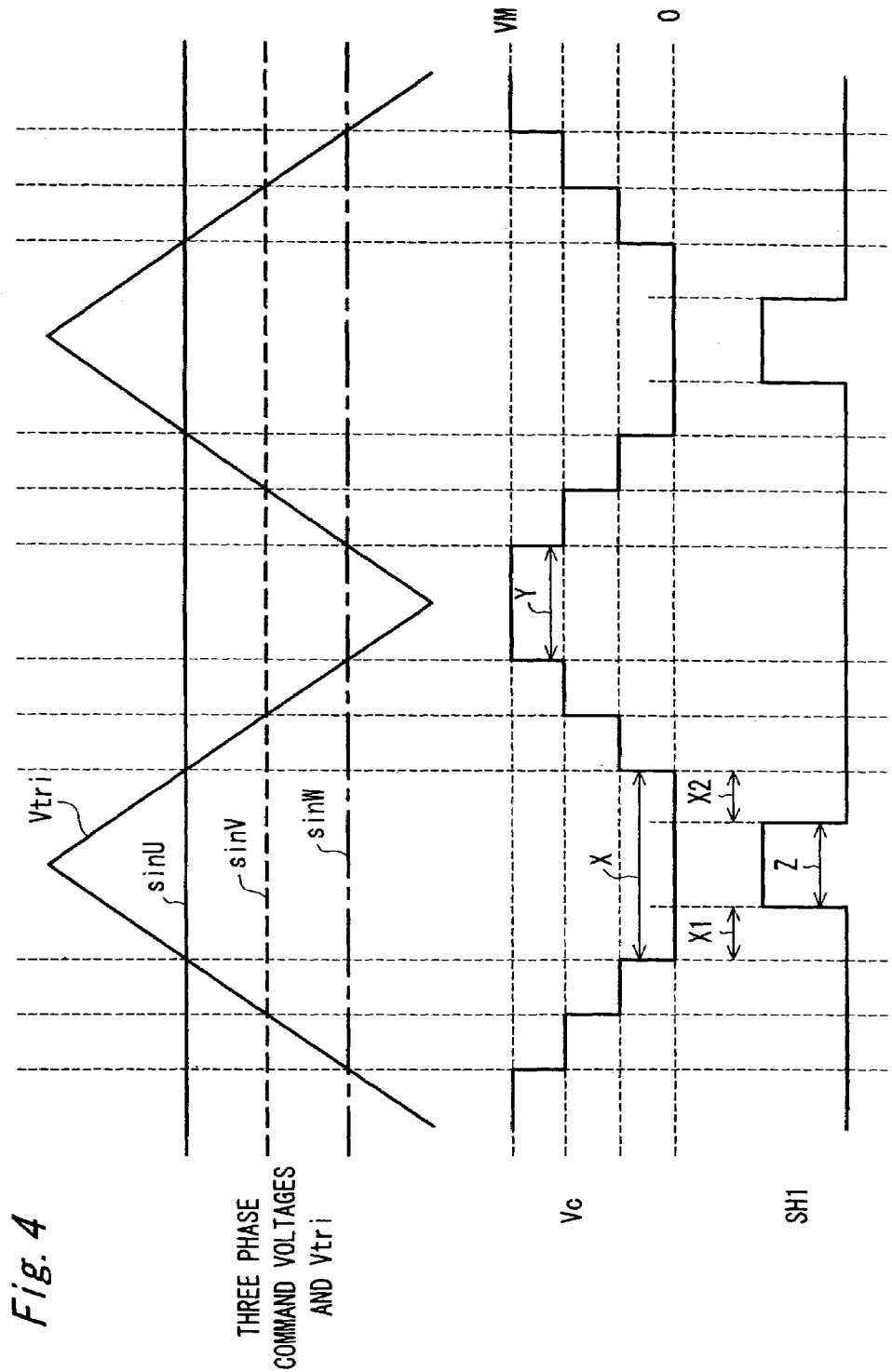
FIG. 4 is a timing chart showing one example of a relationship among three phase command voltages sinU, sinV, sinW, a triangular wave signal Vtri, a neutral voltage Vc of the motor 2, and a sample-and-hold signal SH1.

FIG. 4 shows a timing chart showing one example of a relationship between the three phase command voltages sinU, sinV, sinW, the triangular wave signal Vtri, the neutral voltage Vc of the motor 2, and the sample-and-hold signal SH1. In FIG. 4, it is shown about the three phase command voltages sinU, sinV, sinW and the triangular wave signal Vtri, the neutral voltage Vc, and the sample-and-hold signal SH1. As described above, each power transistor 21 to 26 of the motor driver 4 performs switching operation based on the corresponding drive signal obtained by the pulse width modulation of each phase command voltage sinU, sinV, sinW with the triangular wave signal Vtri. Consequently, the neutral voltage Vc of the motor 2 has a step-shaped waveform as shown in FIG. 4. The period X as shown in FIG. 4 is a period in which all of the transistors 24 to 26 constituting the lower side arm of the motor driver 4 are in an on state. In this period, the neutral voltage Vc of the motor 2 becomes substantially ground voltage level (that is, a voltage value is 0). The period Y as shown in FIG. 4 is a period in which all of the transistors 21 to 23 constituting the upper side arm of the motor driver 4 are in an on state. In this period, the neutral voltage Vc of the motor 2 substantially equals to the voltage value VM of the power source 3. The sample-and-hold signal SH1 shown in FIG. 4 is a signal that becomes "H" level during a period Z in which the periods X1 and X2, which are at the beginning and the end of the period X, are excluded from the period X in which all of the transistors 24 to 26 are in an on state. The sampling and holding operations of the neutral voltage Vc of the motor 2 are performed by the position detector 6 using such a sample-and-hold signal SH1. In FIG. 4, the periods X1 and X2 included in the period X are excluded to allow the position detector 6 to remove the acoustic noise generated at a timing at when the voltage of the neutral voltage Vc changes, in performing the sampling and holding operations of the neutral voltage Vc.

Figure 5:
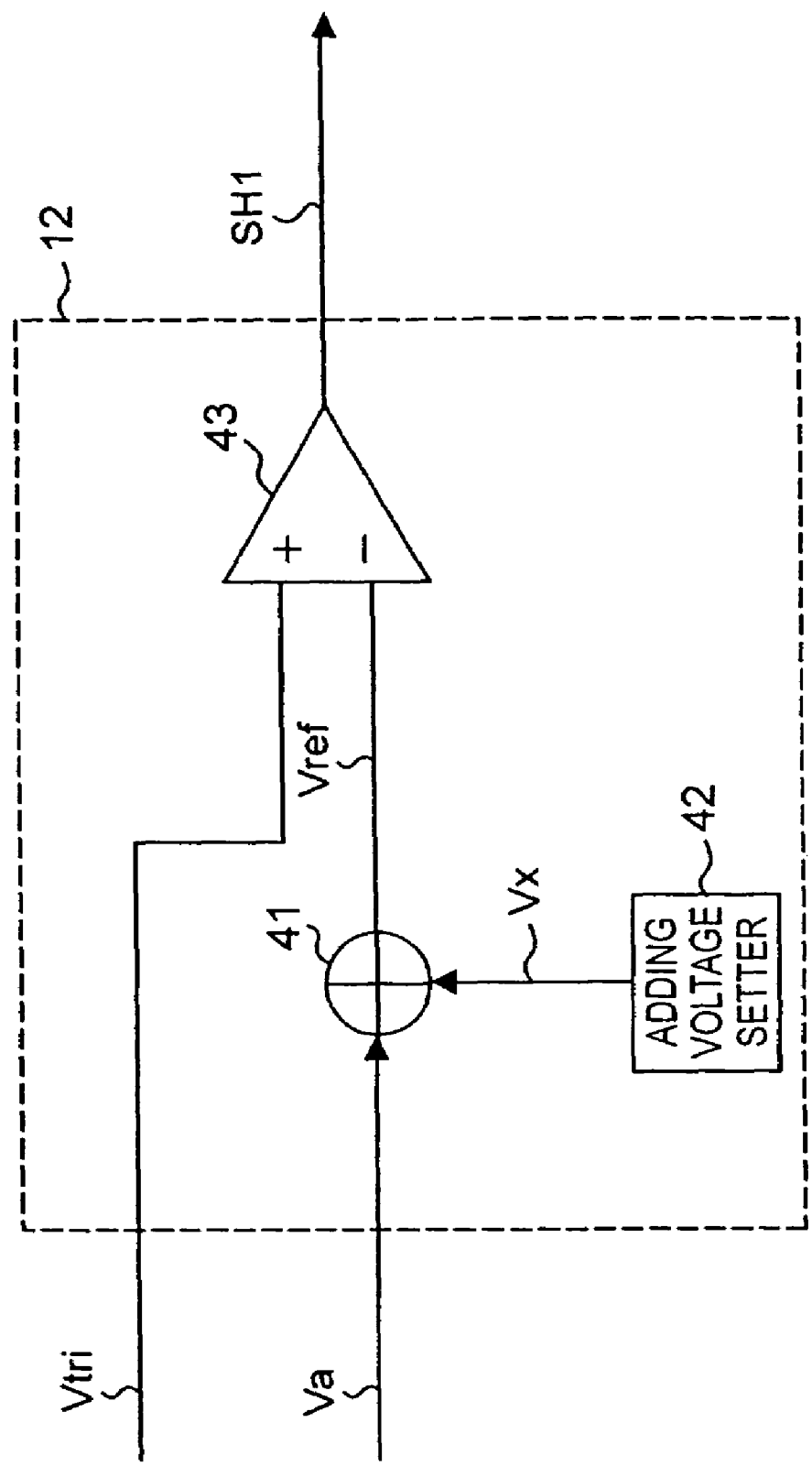
FIG. 5 is a circuit diagram of a specific configuration example of a sample-and-hold signal generator 12 for generating a sample-and-hold signal SH1 shown in FIG. 4.

FIG. 5 shows a circuit diagram of a specific configuration example of the sample-and-hold signal generator 12 for generating the sample-and-hold signal SH1 as shown in FIG. 4. The sample-and-hold signal generator 12 includes an adder 41, an adding voltage setter 42, and a comparator 43. As described above, the amplified signal Va and the triangular wave signal Vtri are input to the sample-and-hold signal generator 12. The adder 41 adds an adding voltage Vx set by the adding voltage setter 42 and a voltage of the amplified signal Va with which an amplitude of each of the three phase command voltages sinU, sinV, sinW is controlled. The output voltage Vref of the adder 41 is sent to an inverting input terminal serving as one of input terminals of the comparator 43, and the triangular wave signal Vtri is sent to the other input terminal, that is, a non-inverting input terminal. The comparator 43 compares the voltage of the triangular wave signal Vtri and the voltage Vref, and outputs a result of the comparison to the position detector 6 as the sample-and-hold signal SH1.

Figure 6:
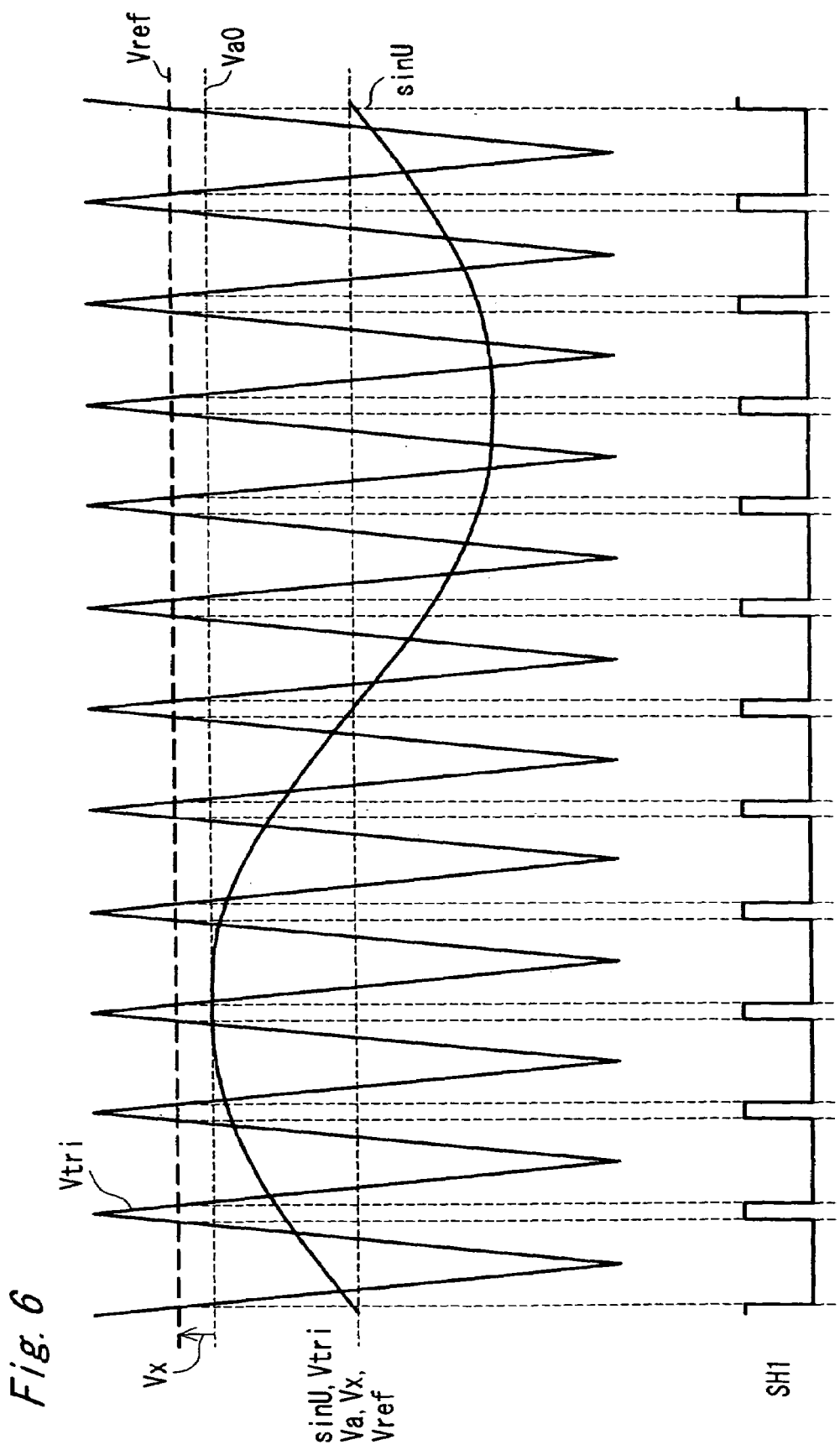
FIG. 6 is a timing chart of an operation of the sample-and-hold signal generator 12 shown in FIG. 5.

FIG. 6 shows a timing chart of an operation of the sample-and-hold signal generator 12 as shown in FIG. 5. In FIG. 6, it is shown about the relationship among the U-phase command voltage sinU, the triangular wave signal Vtri, the amplified signal Va, the output voltage Vref of the adder 41, and the sample-and-hold signal SH1. As described above, the sample-and-hold signal SH1 is at H level during the period Z obtained by excluding the periods X1 and X2 from the period X in which all of the power transistor 24 to 26 are in an on state, that is, in which the voltage of the triangular wave signal Vtri becomes larger than each of the three phase command voltages sinU, sinV, sinW. Here, assuming that a value of an amplitude of each phase command voltage equals to a voltage value Va0 of the amplified signal Va, if a value of the voltage Vref is set to Va0, the sample-and-hold signal SH1 becomes H level, when the voltage of the triangular wave signal Vtri is larger than the voltage Vref, that is, when the voltage of the triangular wave signal Vtri is larger than the voltage of each phase command voltage sinU, sinV, sinW. Further, if the value of the voltage Vref can be set within a range larger than Va0 and smaller than the maximum value of the voltage of the triangular wave signal Vtri, the periods X1 and X2, and therefore, the period Z obtained by excluding the periods X1 and X2 from the period X can be arbitrarily set within a predetermined range. That is, the adding voltage Vx serves as a voltage for setting how much larger the value of the voltage Vref compared with the voltage of the triangular wave signal Vtri is than Va0.

When the sample-and-hold signal generator 12 is configured as above, the period is detected in which all of the phase power transistors 24 to 26 constituting the lower side arm of the motor driver 4 are in an on state (refer to the period Z as shown in FIG. 4). The periods X1 and X2 as shown in FIG. 4 can be set by controlling the adding voltage Vx set by the adding voltage setter 42. In this case, the period X1 and the period X2 are the same.

Figure 7:
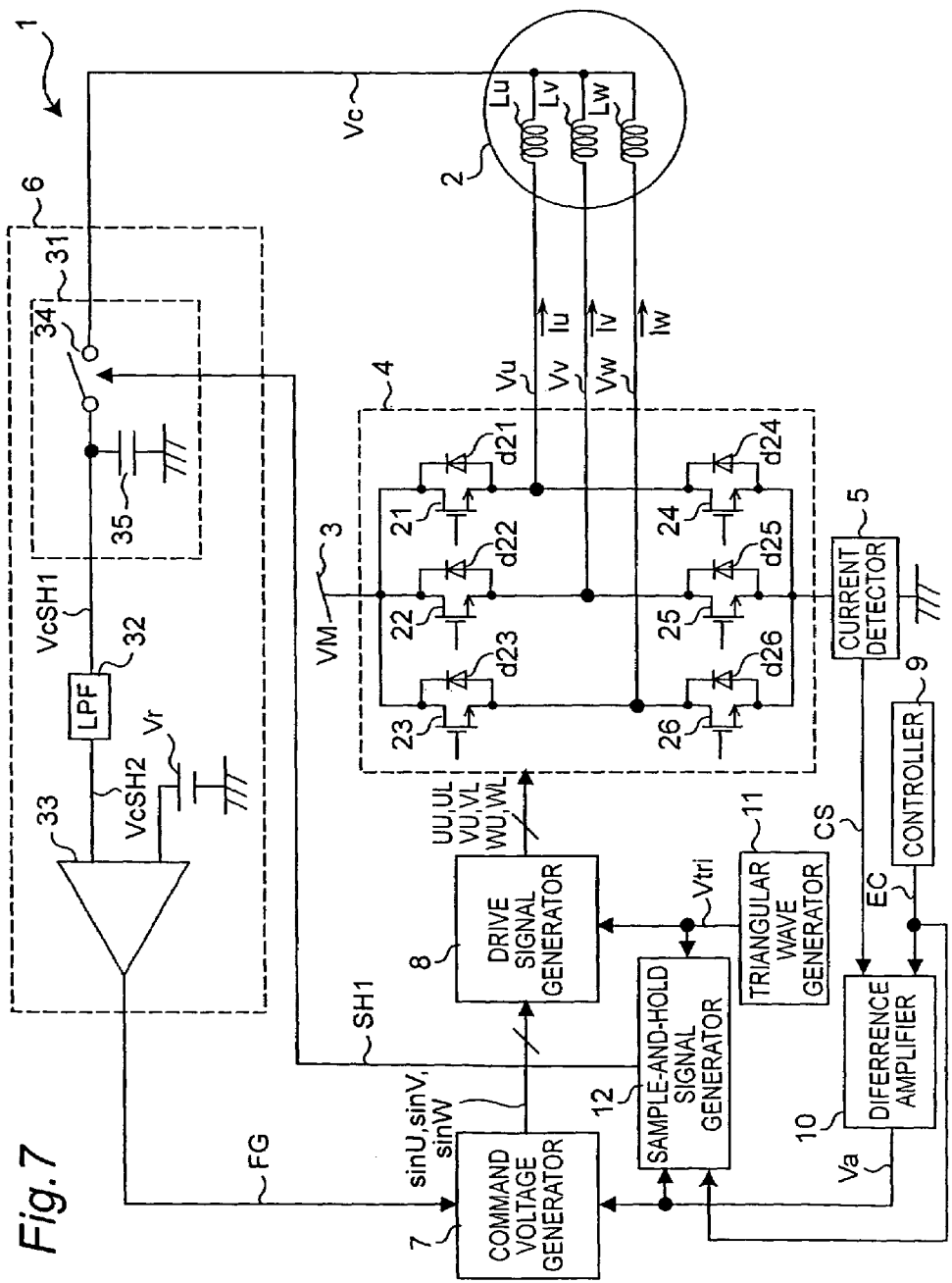
FIG. 7 is a block diagram of a configuration example of the motor driving apparatus 1 in the case that an operation of the sample-and-hold signal generator 12 is controlled according to the torque command signal EC.
Figure 8:
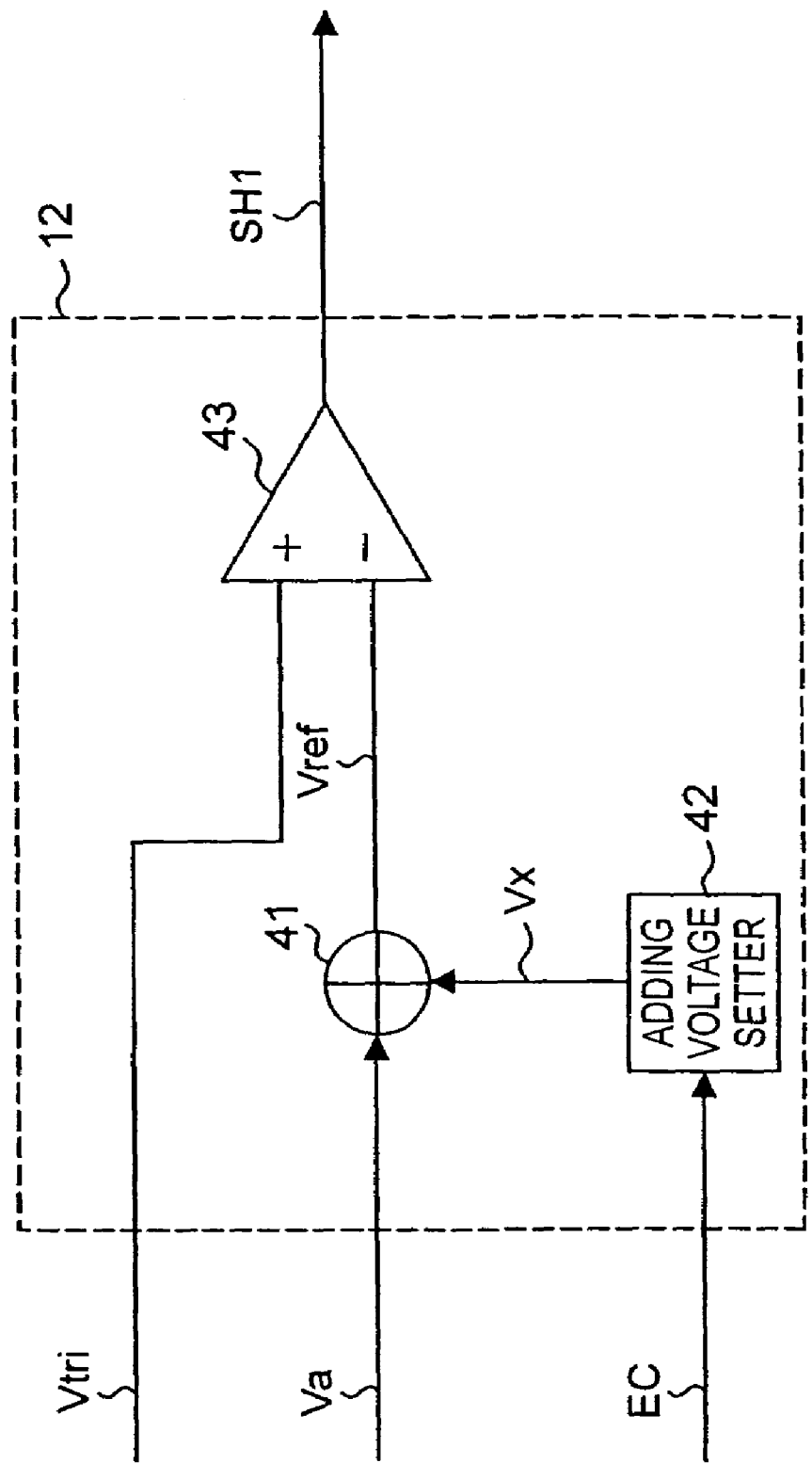
FIG. 8 is a circuit diagram of a configuration example of the sample-and-hold signal generator 12 as shown in FIG. 7.

Further, the adding voltage Vx set by the adding voltage setter 42 may be variable according to the torque command signal EC. FIG. 7 shows a block diagram of the configuration example of the motor driving apparatus 1 in such case. FIG. 8 shows a circuit diagram of a configuration example of the sample-and-hold signal generator 12 shown in FIG. 7. As shown in FIGS. 7 and 8, the torque command signal EC is sent to the adding voltage setter 42 of the sample-and-hold signal generator 12. When the voltage of the torque command signal EC is small, the adding voltage setter 42 sets a small voltage Vx so that the voltage Vref becomes small, and when the voltage of the torque command voltage signal EC is large, it sets a large voltage Vx so that the voltage Vref becomes large. The sample-and-hold signal generator 12 only needs to have a configuration that generates a timing pulse indicating a period in which all of the power transistors 24 to 26 are in an on state, and is not limited to the above configuration. Thus, the sample-and-hold signal generator 12 may be modified in various ways, and such an modified configurations are, needless to say, within a scope of the present invention.

Figure 9:
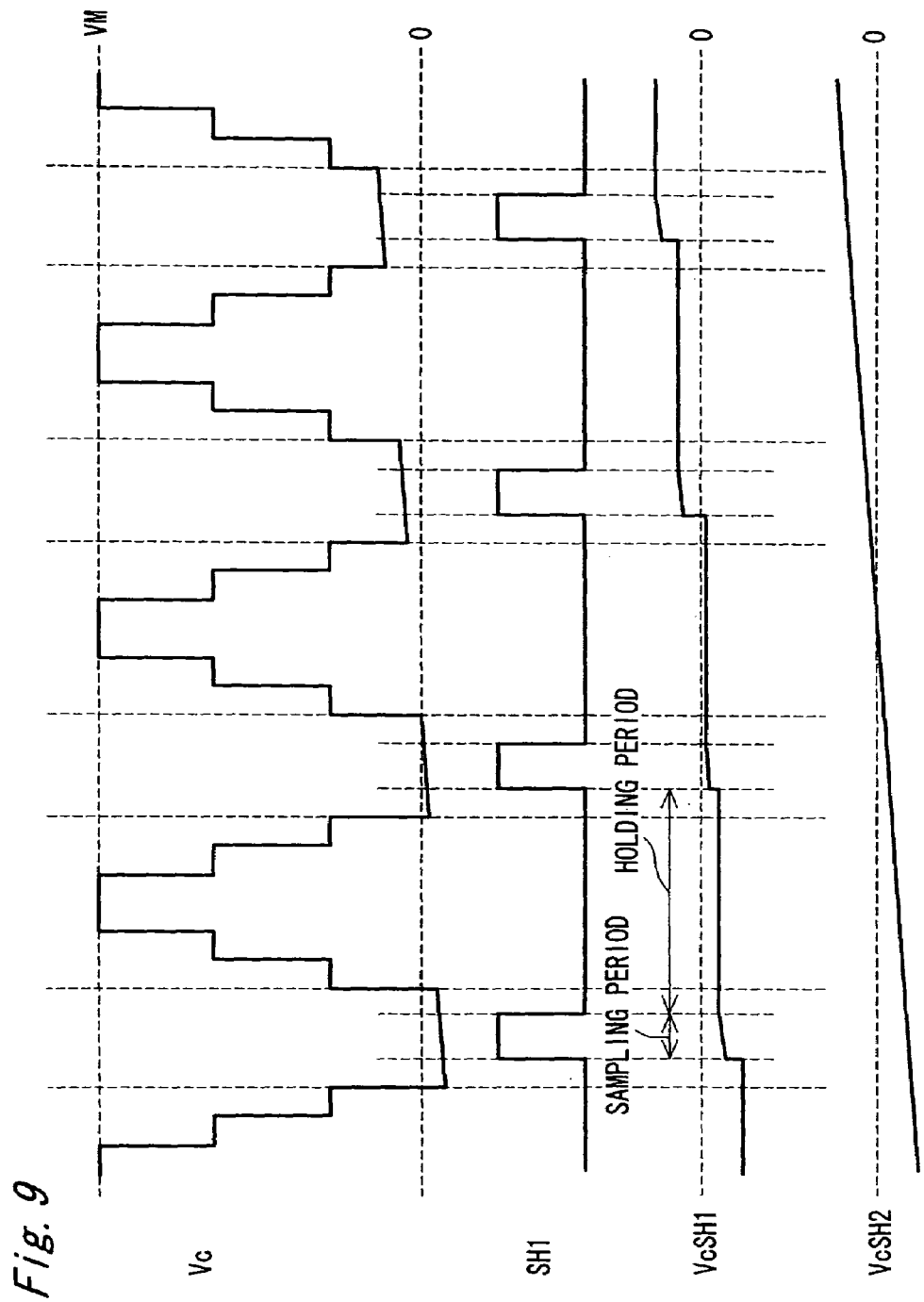
FIG. 9 is a timing chart of the operation of each component of a position detector 6 shown in FIG. 1.

Next, it will be described about the position detector 6. The position detector 6 samples and holds the neutral voltage Vc of the motor 2 based on the signal level of the sample-and-hold signal SH1 to detect the magnetic pole position of the rotor. The detailed operation of the position detector 6 will now be explained. FIG. 9 shows a timing chart of the operation of each component of the position detector 6. In FIG. 9, it is shown about a relationship of the neutral voltage Vc of the motor 2, the sample-and-hold signal SH1, the sample-and-hold output signal VcSH1 which is an output signal of the sample-and-hold circuit 31, and the output signal VcSH2 of the LPF32. The waveform chart of the neutral voltage Vc shown in FIG. 9 particularly illustrates the vicinity of the ground voltage in detail than the waveform chart of the neutral voltage Vc shown in FIG. 4. The switch 34 is opened and closed based on the signal level of the sample-and-hold signal SH1. When the signal level of the sample-and-hold signal SH1 is at H level, the switch 34 is closed to cause an electrical short, and then the neutral voltage Vc of the motor 2 is detected with the capacitor 35 (sampling operation). Thereafter, when the signal level of the sample-and-hold signal SH1 is at L level, the switch 34 is opened to cause an opened state, and then the sampled voltage is held by the capacitor 35 (holding operation). The sample-and-hold circuit 31 thus performs the sampling and holding operations of the neutral voltage Vc of the motor 2 based on the signal level of the sample-and-hold signal SH1, and outputs a result of the sampling-and-holding as the sample-and-hold output signal VcSH1. The sample-and-hold output signal VcSH1 is sent to the LPF 32. The LPF 32 removes a step difference in the sample-and-hold output signal VcSH1 to smooth the signal VcSH1, and outputs the signal VcSH2 in which the step difference is removed to the comparator 33.

A voltage of the sample-and-hold output signal VcSH1, which is obtained by sampling and holding the neutral voltage Vc of the motor 2 for the period in which all of the power transistors 24 to 26 are in an on state, is a voltage superimposed with 3Nth ("N" is a positive integral) harmonic component contained in each phase induced voltage, due to the reasons given hereinafter. It will be described about the reasons why the 3Nth harmonic component contained in each phase induced voltage is detected from the neutral voltage Vc of the motor 2. The relationship between the terminal voltages Vu, Vv, Vw and the neutral voltage Vc of the motor 2 is expressed in the following equation (1), assuming that the winding resistances of three phase coils Lu, Lv, Lw are all the same as $R(\Omega)$, the inductances of them are all the same as $L(mH)$, the currents flowing from the motor driver 4 side to the motor 2 side are Iu, Iv, Iw(A), and three phase induced voltages are Eu, Ev, Ew(V):

$$Vu-Vc=R \cdot Iu+L \cdot dIu/dt+Eu;$$

$$Vv-Vc=R \cdot Iv+L \cdot dIv/dt+Ev; \text{ and}$$

$$Vw-Vc=R \cdot Iw+L \cdot dIw/dt+Ew. \quad (1)$$

Since Iu+Iv+Iw=0 is known from Kirchhoff's rule, equation (1) can be modified as equation (2):

$$Vu+Vv+Vw-3 \cdot Vc=Eu+Ev+Ew. \quad (2)$$

Since the neutral voltage Vc of the motor 2 is sampled and held for the period in which all of the phase power transistors 24 to 26 constituting the lower side arm of the motor driver 4 are in an on state in the motor driving apparatus 1, the following equation (3) is held, assuming that all the on-resistances of the power transistors 24 to 26 have the same $Ron(\Omega)$:

$$Vu=-Ron \cdot Iu;$$

$$Vv=-Ron \cdot Iv; \text{ and}$$

$$Vw=-Ron \cdot Iw. \quad (3)$$

The equation (3) can be changed to equation (4) from Kirchhoff's rule;

$$Vu+Vv+Vw=0. \quad (4)$$

Here, the following equation (5) can be derived from the equations (2) and (4);

$$-3 \cdot Vc=Eu+Ev+Ew. \quad (5)$$

Further, it is assumed that the harmonic component is superimposed on each of the induced voltages Eu, Ev, Ew, as shown by equation (6):

$$Eu=A \cdot \sin \theta+A \cdot B \cdot \sin 2\theta+A \cdot C \cdot \sin 3\theta+A \cdot D \cdot \sin 4\theta+A \cdot E \cdot \sin 5\theta+A \cdot F \cdot \sin 6\theta+ \ldots;$$

$$Ev=A \cdot \sin(\theta-2\pi/3)+A \cdot B \cdot \sin 2(\theta-2\pi/3)+A \cdot C \cdot \sin 3(\theta-2\pi/3)+A \cdot D \cdot \sin 4(\theta-2\pi/3)+A \cdot E \cdot \sin 5(\theta-2\pi/3)+A \cdot F \cdot \sin 6(\theta-2\pi/3)+ \ldots; \text{ and}$$

$$Ew=A \cdot \sin(\theta-4\pi/3)+A \cdot B \cdot \sin 2(\theta-4\pi/3)+A \cdot C \cdot \sin 3(\theta-\pi/3)+A \cdot D \cdot \sin 4(\theta-4\pi/3)+A \cdot E \cdot \sin 5(\theta-4\pi/3)+A \cdot F \cdot \sin 6(\theta-4\pi/3)+ \ldots \quad (6)$$

where "A" shows a fundamental wave amplitude of induced voltage, and "B", "C", "D", "E", and "F" show a content rate of second, third, forth, fifth, and sixth harmonic components, respectively.

From equations (5) and (6), only the 3Nth harmonic component is derived and then the following relationship is realized;

$$-3 \cdot Vc=3 \cdot (A \cdot C \cdot \sin 3\theta+A \cdot F \cdot \sin 6\theta+ \ldots). \quad (7)$$

The equation (7) is written into a general form of $$Vc=-\Sigma A \cdot G(3N) \cdot \sin 3N\theta. \quad (8)$$

Here, G(3N) shows a content rate of the 3Nth harmonic component.

As described above, if the neutral voltage Vc of the motor 2 is sampled and held for a period in which all of the power transistors 24 to 26 constituting the lower side arm of the motor driver 4 are in an on state, the voltage superimposed with 3Nth harmonic component contained in each phase induced voltage can be detected.

Figure 10:
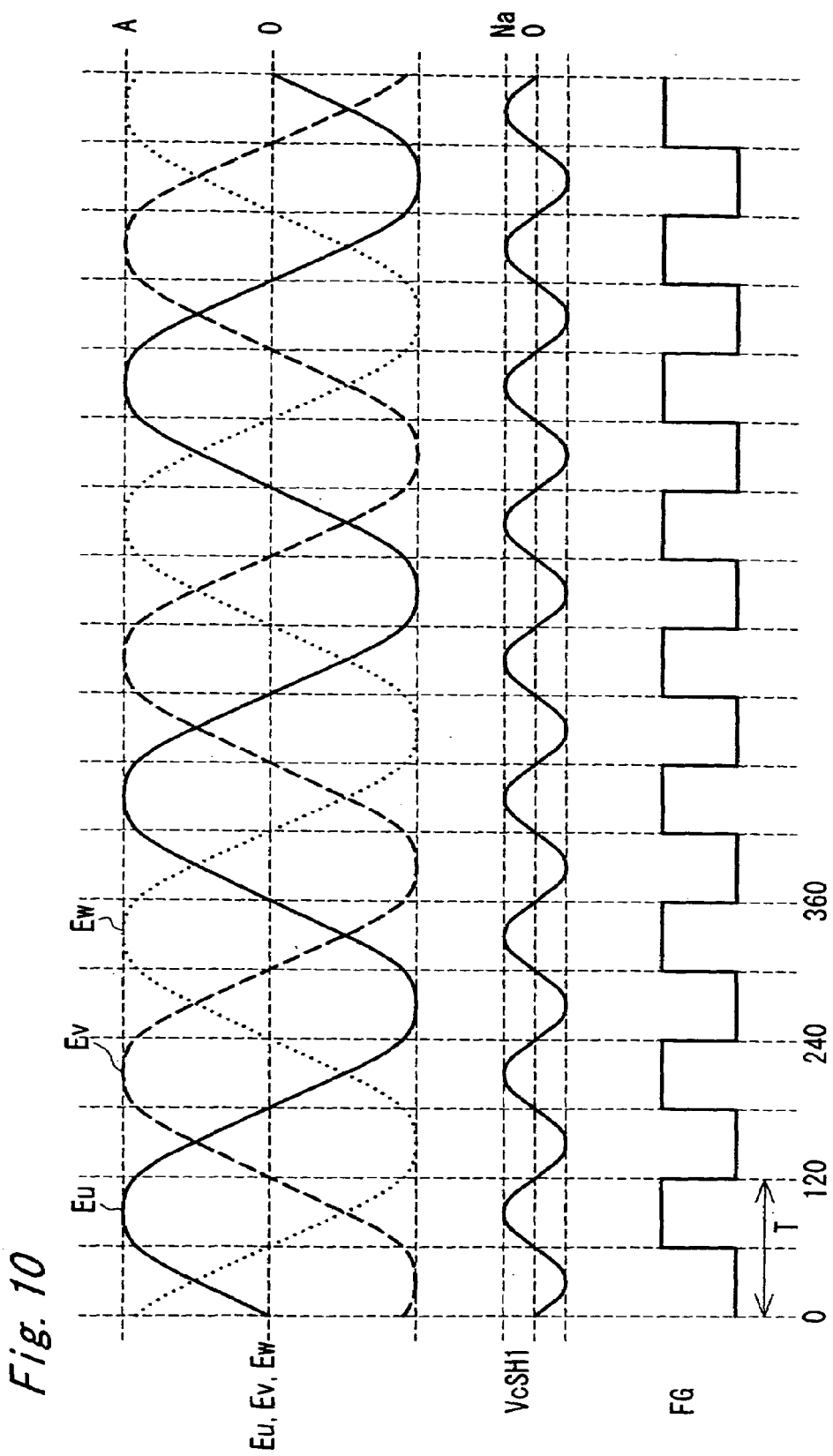
FIG. 10 is a wave chart for explaining a relationship among a U-phase induced voltage Eu, a sample-and-hold output signal VcSH1 and a position detection signal FG.

FIG. 10 shows the relationship between each phase induced voltage Eu, Ev, Ew (whose fundamental wave is only shown), the sample-and-hold output signal VcSH1 and the position detection signal FG. Assuming N=1 in equation (8), that is, assuming that the harmonic components of $N \geq 2$ are extremely small, the signal VcSH1 consists of only the third harmonic component contained in each phases induced voltages Eu, Ev, Ew. The amplitude Na of the detected sample-and-hold output signal VcSH1 is obtained by multiplying the fundamental wave amplitude A of each phase induced voltage Eu, Ev, Ew and the content rate C of the third harmonic component as shown in $Na=A \cdot C$. The sample-and-hold output signal VcSH1 is sent to the LPF 32. The output signal VcSH2 of the LPF 32 is sent to one of the input terminals of the comparator 33. The other input terminal of the comparator 33 is at the reference voltage Vr. In the motor driving apparatus according to the embodiment 1, the reference voltage Vr is set to Vr=0. Therefore, the output signal FG of the comparator 33 becomes a pulse signal having an edge at each of the zero cross points of phases of 0 degree and 180 degrees of the sample-and-hold output signal VcSH1. That is, the signal FG becomes a pulse signal having an edge at the zero cross point at an interval of a phase of 180 degrees of each phase induced voltage Eu, Ev, Ew. Thus, the magnetic pole position of the rotor can be detected at an interval of electric angle of 60 degrees. The pulse signal is sent from the comparator 33 to the command voltage generator 7 as the position detection signal FG.

Figure 11:
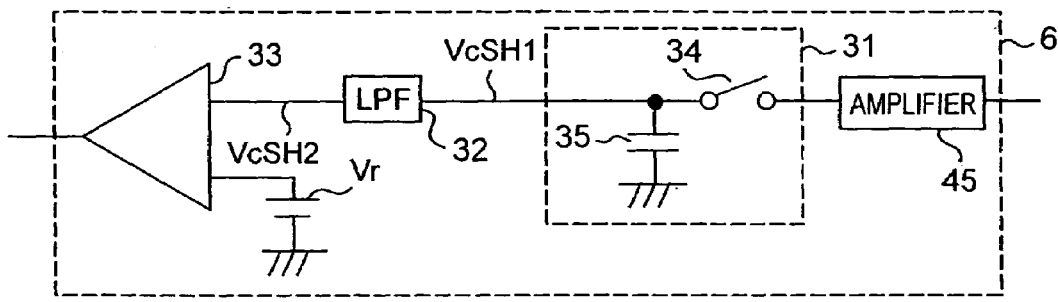
FIG. 11 is a circuit diagram of a configuration example of the position detector 6 in the case of amplifying a neutral voltage Vc of the motor 2.
Figure 12:
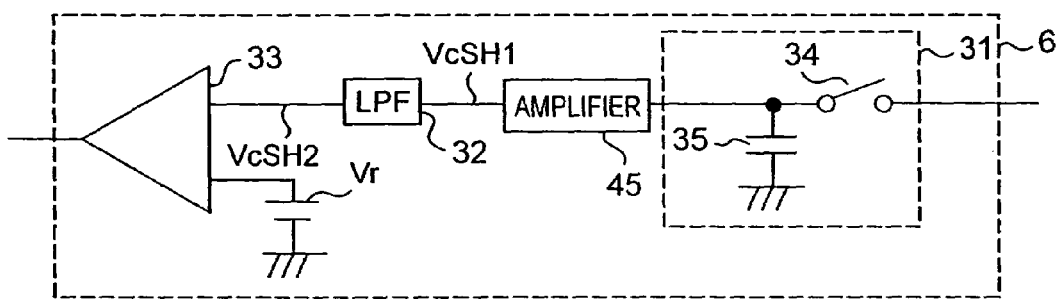
FIG. 12 is a circuit diagram of a configuration example of the position detector 6 in the case of amplifying the sample-and-hold output signal VcSH1.

The amplitude of the sample-and-hold output signal VcSH1 depends on the fundamental wave amplitude of each phase induced voltage and a content rate of the third harmonic component in each phase induced voltage. Therefore, when each phase induced voltage is small because of the low-speed rotation of the motor 2, or when the content rate of the third harmonic component is extremely small in the each phase induced voltage, the amplitude of the sample-and-hold output signal VcSH1 may become small, and therefore, the detection accuracy of the magnetic pole position of the rotor may become poor. As a method for avoiding such poor detecting accuracy, there are, for example, amplifying the neutral voltage Vc of the motor 2 by means of an amplifier and then sampling and holding the amplified signal, and amplifying the sample-and-hold output signal VcSH1. FIG. 11 shows a circuit diagram of the configuration example of the position detector 6 in the case of amplifying the neutral voltage Vc, and FIG. 12 shows a circuit diagram of the configuration example of the position detector 6 in the case of amplifying the sample-and-hold output signal VcSH1. In the case of amplifying the neutral voltage Vc as shown in FIG. 11, the position detector 6 includes an amplifier 45 for amplifying the neutral voltage Vc at the pre-stage of the sample-and-hold circuit 31. In the case of amplifying the sample-and-hold output signal VcSH1 as shown in FIG. 12, the position detector 6 includes the amplifier 45 between the sample-and-hold circuit 31 and the LPF 32. The configuration of the position detector 6 is, however, not limited to the examples shown in FIGS. 11 and 12. The various modifications of the configuration of the position detector 6 may be made without departing from the purpose of the present invention, and such modified configurations are, needless to say, within a scope of the present invention. Further, the position detector 6 may have a configuration that does not include the LPF 32. When including the LPF 32, the position detector 6 desirably has a configuration in which the phase delay amount by the LPF 32 is corrected in the command voltage generator 7.

Figure 13:
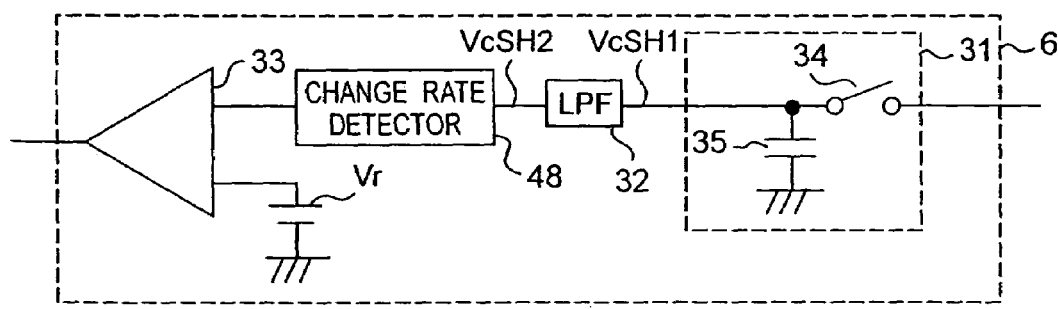
FIG. 13 is a circuit diagram of a configuration example of the position detector 6 in the case that a position at an interval of the phase of the predetermined degree of each phase induced voltage may be detected by detecting a rate of change of the sample-and-hold output signal VcSH1.

In the motor driving apparatus according to the embodiment 1, the zero cross point of the each phase induced voltage is detected at an interval of a phase of 180 degrees of each phase induced voltage by the comparator 33 comparing the voltage of the sample-and-hold output signal VcSH1 with the reference voltage, but the position at an interval of the phase of 90 degrees or 270 degrees of each phase induced voltage may be detected by detecting a rate of change of the sample-and-hold output signal VcSH1. FIG. 13 is a circuit diagram of a configuration example of the position detector 6 in such case. As shown in FIG. 13, the position detector 6 includes a change rate detector 48 between the LPF 32 and the comparator 33 to detect the rate of change of the signal VcSH2. Since the rate of change of the signal VcSH2 becomes 0 at a position when a phase of each phase induced voltage is 90 degrees and 270 degrees, the comparator 33 outputs the position detection signal FG whose signal level changes at a timing when a phase of each phase induced voltage is 90 degrees and 270 degrees. In this case, the point at which the level of the position detection signal FG changes is shifted by 90 degrees in an electrical angle from the zero cross point of each phase induced voltage. Therefore, when detecting a position at which a phase of each phase induced voltage is 90 degrees or a position at which it is 270 degrees, the amount of the phase shift may be corrected in the command voltage generator 7. The detection of a predetermined phase position of each phase induced voltage is not limited to be performed by detecting a zero cross point of each phase induced voltage and by detecting 90-degree phase or 270-degree phase of each phase induced voltage, and may be carried out by detecting any voltage of the sample-and-hold signal VcSH1 which corresponds to the predetermined phase position of each phase induced voltage.

Here, it will be briefly described about the operation from starting to a steady rotation. The motor driving apparatus according to the embodiment 1 has a configuration to detect the third harmonic component contained in each phase induced voltage, and therefore, if each phase induced voltage is small and therefore the amplitude of the sample-and-hold output signal VcSH1 is small during the stopped state and low-speed rotation of the motor, the magnetic pole position of the rotor can not be detected or the detecting precision becomes poor. Thus, the rotating speed of the rotor must be accelerated up to the speed at which the magnetic pole position of the rotor can be detected, through some kind of method. Generally, various methods for the sensorless starting such as an initial position estimating method or a forcible commutating method are being developed, but are not limited to a specific method in a motor driving apparatus 1 according to the embodiment 1. The method only needs to accelerate up the rotating speed of the rotor to the speed at which the magnetic pole position of the rotor can be detected. After accelerating it up to such a rotating speed through an appropriate method, the method proceeds to the sensorless drive and the sensorless drive is performed with a substantially sinusoidal wave.

In the motor driving apparatus 1 according to the embodiment 1, the position detection signal FG is obtained by detecting the zero cross point at an interval of a phase of 180 degrees of each phase induced voltage. It can not be, however, detected from the position detection signal FG which falling edge of the position detection signal FG corresponds to the zero cross point at 0-degree phase (hereinafter, referred to as "absolute position") of the U-phase induced voltage. Therefore, before proceeding to the sensorless drive, it needs to be detect which falling edge of the position detection signal FG corresponds to the absolute position. As an example of a method for detecting the absolute position of the induced voltage, there is a free run detection method. It will be described in detail about the free run detection method. The free run detection method is a method for directly detecting the three phase induced voltages appearing in the three phase terminal voltages Vu, Vv, Vw by making all of the phase power transistors 21 to 26 of the motor driver 4 turned off. According to this method, it is possible to detect, for example, the U-phase induced voltage Eu by monitoring the U-phase terminal voltage Vu during the free run detection, that is, it is possible to detect the absolute position of the U-phase induced voltage. It will be described about the motor driving apparatus employing the free run detection, with reference to FIGS. 14 to 17.

Figure 14:
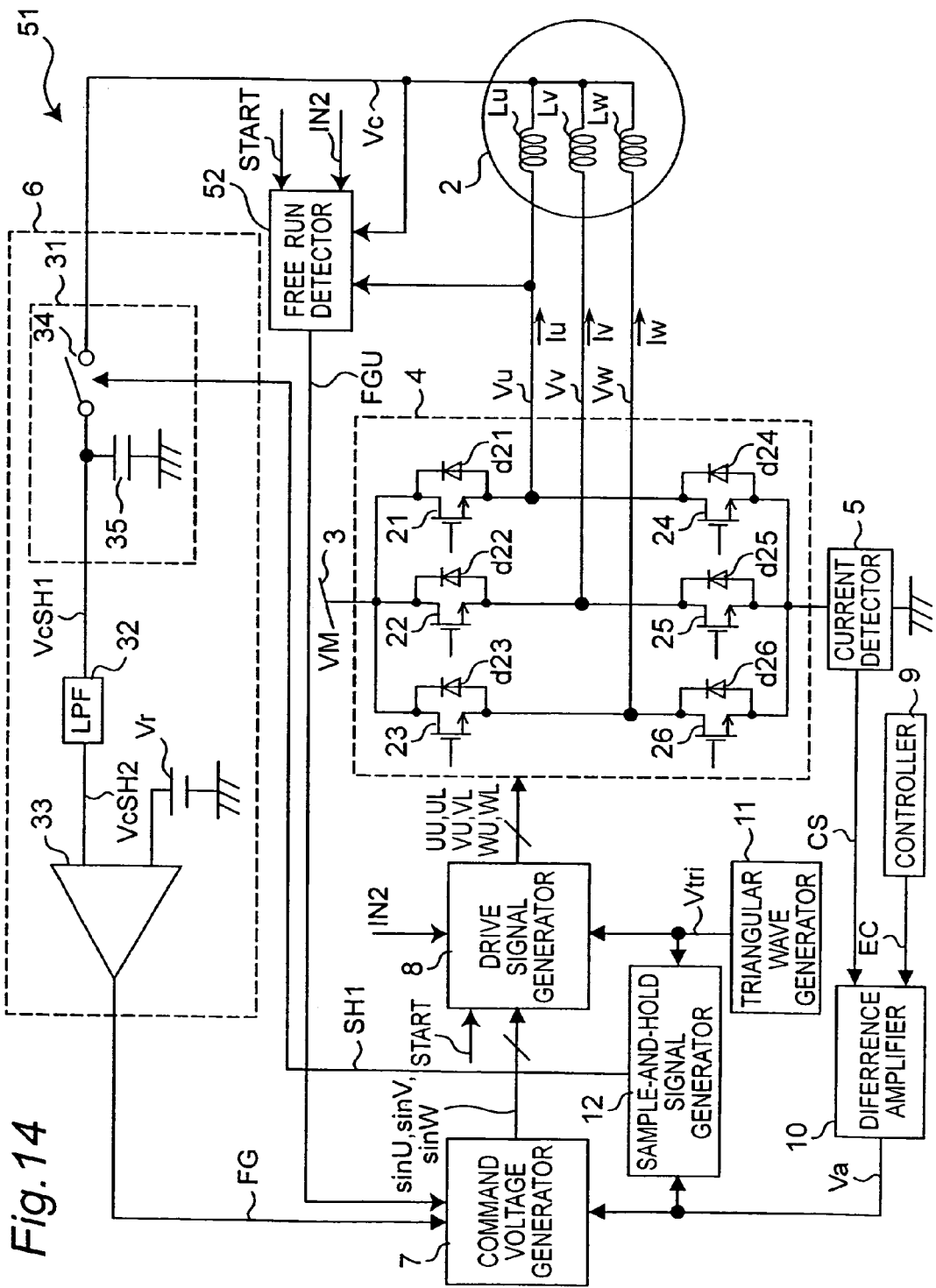
FIG. 14 is a block diagram of a configuration example of a motor driving apparatus employing the free run detection.

FIG. 14 is a block diagram of a configuration example of a motor driving apparatus employing the free run detection. As shown in FIG. 14, the motor driving apparatus 51 has a configuration in which a free run detector 52 is added to the motor driving apparatus 1 shown in FIG. 1. The free run detector 52 compares the U-phase terminal voltage Vu with the neutral voltage Vc of the motor 2 during the free run detection to generate the signal FGU indicating a timing of the zero cross point at the 0-degree phase of the U-phase induced voltage Eu appearing in the U-phase terminal voltage Vu.

Figure 15:
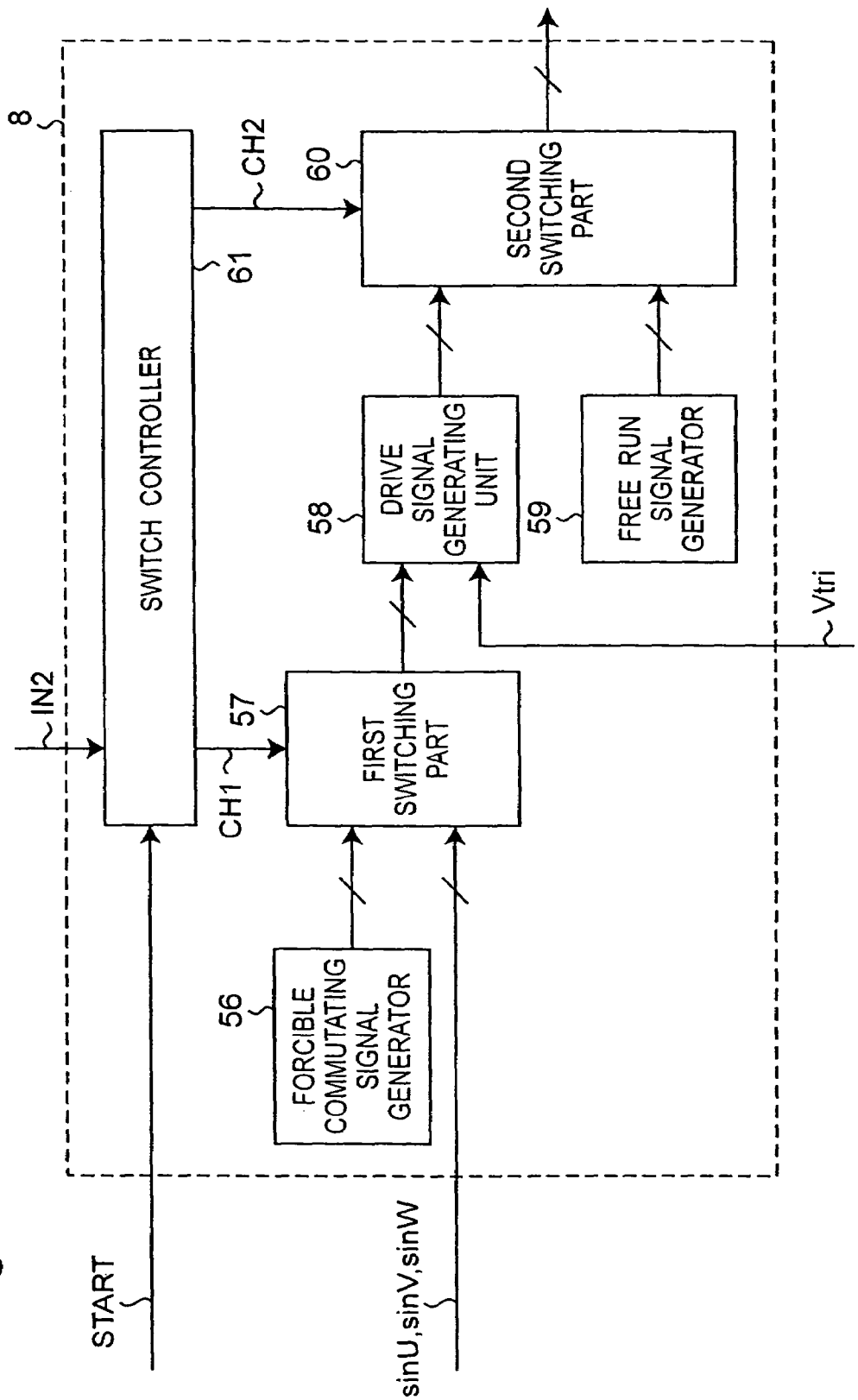
FIG. 15 is a block diagram of a specific configuration example of the drive signal generator 8.

FIG. 15 is a block diagram of a specific configuration example of the drive signal generator 8. As shown in FIG. 15, the drive signal generator 8 includes a forcible commutating signal generator 56, a first switching part 57, a drive signal generating unit 58, a free run signal generator 59, a second switching part 60, and a switch controller 61. The switch controller 61 sends a first switching control signal CH1 and a second switching control signals CH2 to the first switching part 57 and the second switching part 60, respectively. The forcible commutating signal generator 56 generates and outputs a forcible commutating signal, e.g., a three-phase sinusoidal wave-shaped signal of a predetermined frequency at starting of the motor driving apparatus 51. The first switching part 57 selects and outputs either the three-phase sinusoidal wave-shaped signal output from the forcible commutating signal generator 56 or the three-phase command voltage signal (voltages sinU, sinV, sinW) output from the command voltage generator 7 based on the first switching control signal CH1. The drive signal generating unit 58 performs pulse width modulation on the signal selected by the first switching part 57 with the triangular wave signal Vtri, and outputs a result of the pulse width modulation to the second switching part 60 as the drive signals for controlling the drive of each phase power transistor 21 to 26 of the motor driver 4. The free run signal generator 59 generates and outputs the drive signals (also referred to as "free run signals") for turning off all of the phase power transistors 21 to 26. The second switching part 60 selects either the signals received from the drive signal generating unit 58 or the signals received from the free run signal generator 59, and sends the selected signals to the motor driver 4. The forcible commutating signal generator 56 constitutes a forcible periodic signal generator, the drive signal generating unit 58 constitutes a first generator, and the free run signal generator 59 constitutes a second generator. The first switching part 57 and the second switching part 60 constitute a first selector and a second selector, respectively. Further, the switch controller 61 constitutes a selection controller. Here, "forcible commutating signal" is also referred to as "forcible periodic signal".

Figure 16:
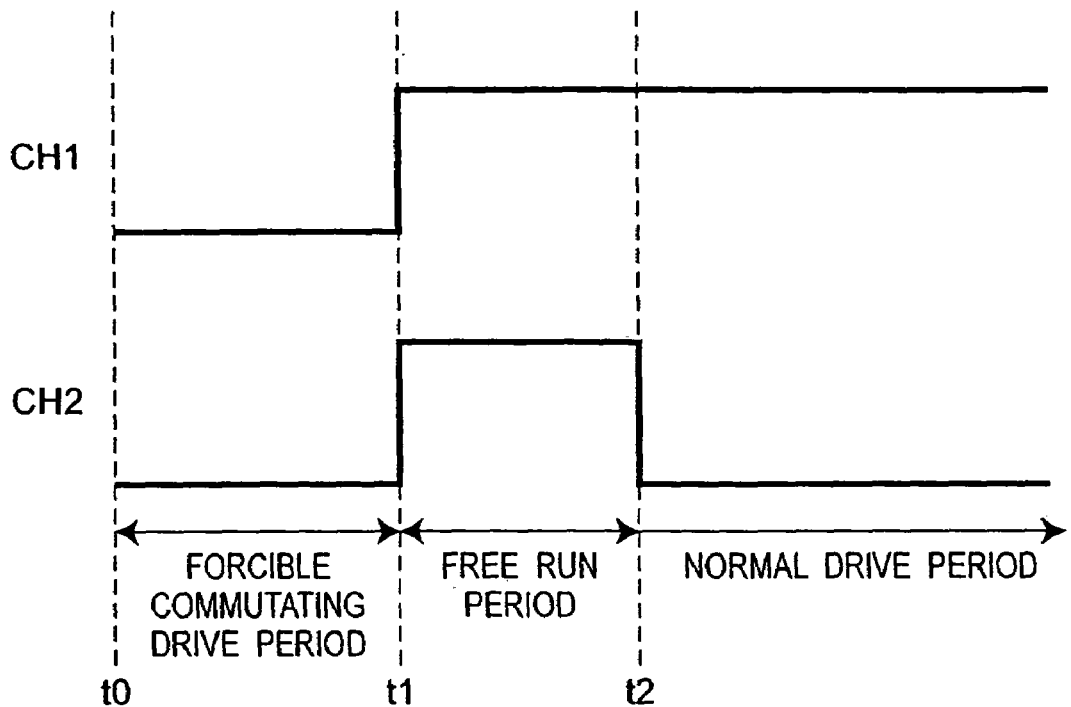
FIG. 16 is a timing chart of a first switching control signal CH1, and a second switching control signal CH2.

It will be described about the operation of the drive signal generator 8, with reference to FIG. 16. FIG. 16 is a timing chart of the first and second switching control signals CH1 and CH2. The switch controller 61 sends the first and second switching control signals CH1 and CH2 whose signal levels are L levels, when receiving the starting signal START from the external part of the motor driving apparatus 51. In this case, the first switching part 57 selects the output signal of the forcible commutating signal generator 56, and sends it to the drive signal generating unit 58. The drive signal generating unit 58 performs pulse width modulation on the three-phase sinusoidal wave-shaped signal with the triangular wave signal Vtri to generate the drive signals, that is, electrical conduction control signals for controlling the drives of the power transistors 21 to 26 of the motor driver 4. Then, the second switching part 60 selects the signals received from the drive signal generating unit 58, because the second switching control signal CH2 is at L level, and sends the same to the motor driver 4. Therefore, the motor 2 is forcibly driven based on the forcible commutating signal of a predetermined frequency for a period ("forcible commutating drive period" shown in FIG. 16) in which the first and second switching control signals CH1 and CH2 are at L level after the starting of the motor driving apparatus 51. The predetermined frequency of the forcible commutating signal is not limited to a fixed frequency, and may be a variable frequency that increases with time.

The switch controller 61 then makes the first switching control signal CH1 at H level and simultaneously, the second switching control signal CH2 at H level. The first switching part 57 selects the three-phase command voltage signal received from the command voltage generator 7, and sends it to the drive signal generating unit 58, because the first switching control signal CH1 is at H level. The drive signal generating unit 58 performs pulse width modulation on the three-phase command voltage signal with the triangular wave signal Vtri to generate the drive signals for controlling the drives of the power transistors 21 to 26 of the motor driver 4. The second switching part 60 selects and outputs the free run signals sent from the free run signal generator 59, because the second switching control signal CH2 is at H level. Since the free run signals are signals for turning off all of the power transistors 21 to 26 as mentioned above, the power transistors 21 to 26 are in an off state for a period ("free run period" shown in FIG. 16) in which the second switching control signal CH2 is at H level, while the motor 2 is in a state rotating at inertia. In this state, the three phase induced voltages Eu, Ev, Ew appear as the three phase terminal voltages Vu, Vv, Vw, respectively. Here, if the U-phase terminal voltage Vu is compared with the neutral voltage Vc of the motor 2 by the free run detector 52 in the free run state, the zero cross point at the 0-degree phase of the induced voltage Eu can be detected. Specifically, the neutral voltage Vc of the motor 2 is substantially constant at the voltage value of VM/2 in the free run state. And, the U-phase terminal voltage Vu of a sinusoidal wave-shape has a voltage value of VM/2 at the phases of 0 degree and 180 degrees. Thus, the zero cross point at the 0-degree phase of the induced voltage Eu is a point where the U-phase terminal voltage Vu equals to the neutral voltage Vc of the motor 2 at increase in the U-phase terminal voltage Vu. The free run detector 52 generates the timing signal FGU which represents the timing when the U-phase terminal voltage Vu equals to the neutral voltage Vc of the motor 2 at increase in the U-phase terminal voltage Vu, that is, the timing of the zero cross at the 0-degree phase of the induced voltage Eu. The free run detector 52 sends a timing signal FGU to the command voltage generator 7.

The switch controller 61 then changes the second switching control signal CH2 from H level to L level. The second switching part 60 selects and outputs each drive signal received from the drive signal generating unit 58. Therefore, the motor 2 is driven based on the three phase command voltages sinU, sinV, sinW generated by the command voltage generator 7.

In the motor driving apparatus 51, the command voltage generator 7 generates the U-phase command voltage sinU which has the zero cross point at the 0-degree phase thereof at the timing represented by the timing signal FGU. The V-phase and W-phase command voltages sinV, sinW are generated by simply shifting the phase of the U-phase command voltage sinU forward and backward by 120 degrees when the U-phase command voltage sinU is generated. According to this method, the falling edge of the position detection signal FG corresponding to the absolute position of the U-phase induced voltage can be determined, since the induced voltage is directly detected for electrical conduction control.

In the motor driving apparatus 51, the free run detector 52 has a configuration which receives only the U-phase terminal voltage Vu, but may have a configuration which receives also the V-phase and W-phase terminal voltages Vv and Vw to detect the timing of the zero cross at the 0-degree phase of each phase induced voltage. In the example as described above, the timing of the zero cross at the 0-degree phase of the induced voltage Eu, that is, the timing of the zero cross at increase of the induced voltage Eu is detected, but the timing of the zero cross of the 180-degree phase thereof, that is, the timing of the zero cross at decrease thereof may also be detected. Further, the timing of the zero cross both at the 0-degree phase of the induced voltage Eu and at the 180-degree phase thereof may be detected in a distinguishable manner.

The signal levels of the first and second switching control signals CH1 and CH2 may be switched by the switch controller 61 based on the rotation speed of the motor 2 (that is, the rotation speed of the rotor) or be switched after a predetermined time has elapsed from the starting of the motor driving apparatus 51 (for example, after elapse of time t1 from the starting of the motor driving apparatus 51 and after elapse of time t2 from it, as shown in FIG. 16). When the switching timing is determined based on the rotating speed of the rotor, the control signal IN2 representing the rotating speed of the rotor may be sent from the external part of the motor driving apparatus 51 to the switching control part 61. While, the free run detector 52 only operates while the free run signal generator 59 outputs the free run signals. Therefore, the free run detector 52 may operate during the period same as the period for which the switch controller 61 keeps both of the first and the second switching control signal CH1 and CH2 at H level, by receiving the starting signal START and the control signal IN2.

Figure 17:
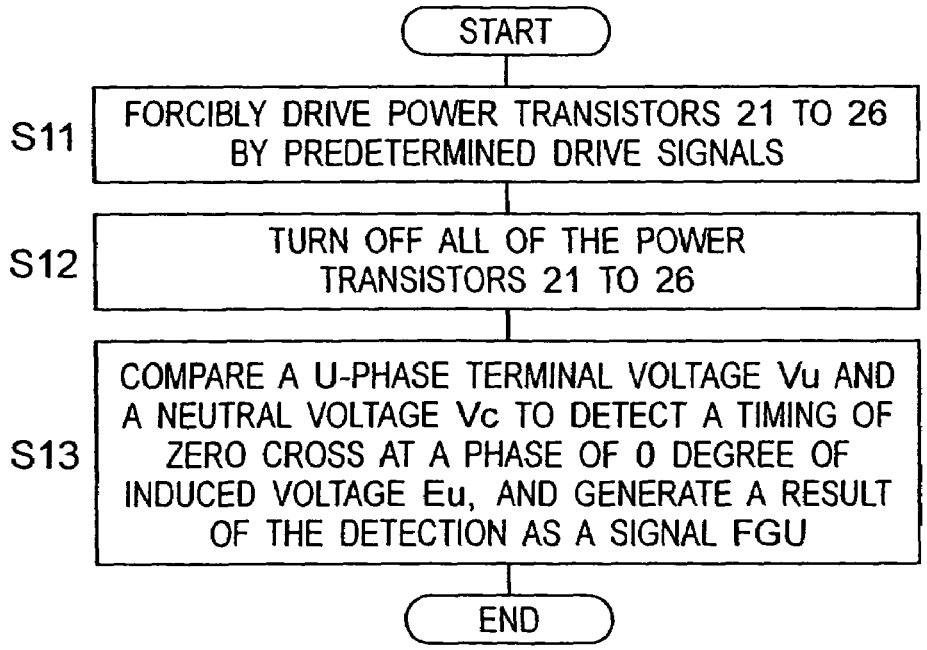
FIG. 17 is a flow chart of a motor driving method of starting from forcible commutation and proceeding to the sensorless drive by way of the free run detection.

FIG. 17 shows a flow chart of a starting method operated through the free run detection after starting of forcible commutation drive and before proceeding to the sensorless drive. First, in the forcible commutating drive, the power transistors 21 to 26 is forcibly driven (step S11) by predetermined drive signals generated based on the predetermined three-phase sinusoidal wave-shaped signal output from the forcible commutating signal generator 56. Next, all of the power transistors 21 to 26 are turned off (step S12) for free run detection. The U-phase terminal voltage Vu and the neutral voltage Vc of the motor 2 are compared in the free run state to detect the timing of the zero cross point at the 0-degree phase of the induced voltage Eu, and a result of the detection is generated as the signal FGU (step S13).

Figure 18:
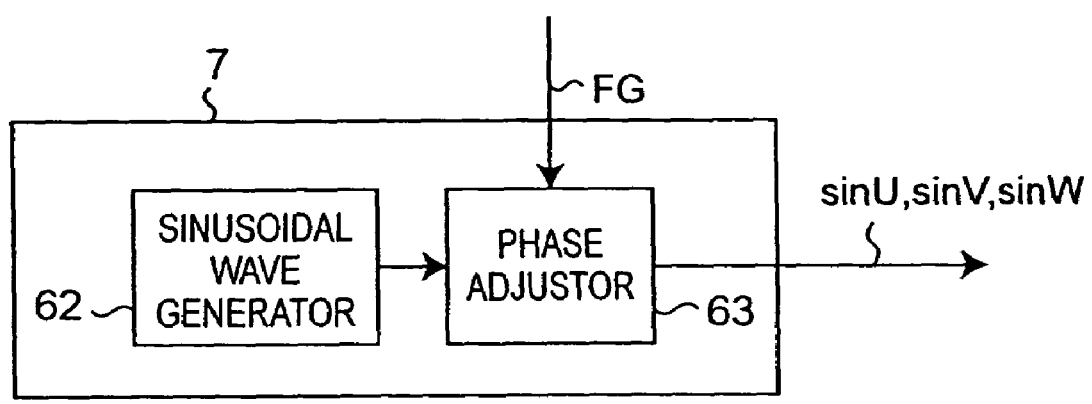
FIG. 18 is a block diagram of a modification example of a configuration of the command voltage generator 7.

As an example of a specific method for generating the three phase command voltages from the position detection signal FG, there is also a method of generating three predetermined sinusoidal wave-shaped signals, and then matching the 0-degree phase of each of the generated sinusoidal wave-shaped signals with the falling edge of the position detection signal FG. FIG. 18 is a block diagram of a configuration example of the command voltage generator 7 for performing such operation. As shown in FIG. 18, the command voltage generator 7 includes a sinusoidal wave generator 62 and a phase adjustor 63. The sinusoidal wave generator 62 generates three sinusoidal wave-shaped signals each of which has a predetermined period, and outputs them sequentially. Then, the phase adjustor 63 adjusts the phases of the three sinusoidal wave-shaped signals so that three continuous 0-degree phase of the three sinusoidal wave-shaped signals is matched with the three continuous falling edges of the position detection signal FG, and outputs the adjusted three sinusoidal wave-shaped signals to the outside as three phase command voltage signals sinU, sinV, sinW.

As described above, the motor 2 is driven based on the forcible commutating signal of sinusoidal wave-shape from the starting. Thus, it is possible to drive the motor 2 with vibration and acoustic noise, caused by the non-conducting period, reduced from starting to the normal operation. In the above description, the forcible commutating signal is a sinusoidal wave-shaped signal, but may be a 180-degree electrical conduction waveform or a wide angle electrical conduction waveform having a non-conducting period as in the prior art. Further, as long as it is a starting method of proceeding to the sensorless drive after the forcible commutation drive by way of free run detection drive, it is not limited to the above starting method and various modifications can be made in the starting method. Such modified method is of course encompassed in the present invention.

As described above, when the U-phase command voltage is generated based on the detected absolute position of the U-phase induced voltage, and then the free run detection is released to proceed to the normal sensorless drive, the falling edge of the position detection signal FG corresponding to the absolute position of the U-phase induced voltage can be detected. That is, by proceeding to the normal sensorless drive from the starting of the motor driving apparatus 51 by way of the free run detection, it is possible to detect which falling edge of the position detection signal FG corresponds to the zero cross point at the 0-degree phase of the U-phase induced voltage. When forcible commutation drive is carried out with a substantially sinusoidal wave at the starting of the motor driving apparatus 51, it is possible to drive always the motor 2 with a substantially sinusoidal wave.

As another method for detecting the absolute position of the induced voltage, a sensorless drive which needs a non-conducting period represented by the conventional method may be performed only at starting of the motor driving apparatus 51. According to such sensorless drive, the absolute position of the induced voltage can be constantly detected until transfer to the substantially sinusoidal wave sensorless drive. As further another method for detecting the absolute position of the induced voltage, there is also a method of performing forcible commutation drive with a substantially sinusoidal wave, and estimating the position detection signal FG (zero cross point) detected during forcible commutation drive from the current forcible commutating timing. Specifically, if the current electrical conduction timing is the electrical conduction timing to the U-phase with respect to the zero cross point of 0-degree phase detected during forcible commutation drive, the detected zero cross point of 0-degree phase is considered as the zero cross point of the 0-degree phase of the U-phase induced voltage. As described above, with the configuration of detecting the absolute position of the induced voltage from starting to the sensorless drive, it is possible to drive the motor 2 with a substantially sinusoidal wave sensorless from starting to a steady rotation.

As described above, the motor driving apparatus 1 according to the embodiment 1 detects the magnetic pole position of the rotor by sampling and holding the neutral voltage Vc of the motor 2 for a period in which the power transistors 24 to 26 constituting the lower side arm of the motor driver 4 are in an on state, to perform the sensorless drive. Therefore, the motor driving apparatus according to the embodiment 1 detects the zero cross point of each of the three phase induced voltages without needing the non-conducting period for detecting the magnetic pole position of the rotor, as opposed to the conventional motor driving apparatus which detects the zero cross point of each of the three phase induced voltages by comparing each phase terminal voltage with the neutral voltage of the motor 2 in the non-conducting period in which the driving current is 0, to perform the sensorless drive. That is, according to the motor driving apparatus according to the embodiment 1, it is possible to realize a substantially sinusoidal wave sensorless drive with reduced vibration and acoustic noise caused by the presence of the non-conducting period. Further, the position detector 6 of the motor driving apparatus 1 samples and holds only the neutral voltage Vc of the motor 2. Thus, as opposed to the conventional motor driving apparatus in which all of the terminal voltages are sampled and held, the sample-and-hold circuit or a switch selecting circuit for selecting one terminal voltage of the non-conduction phase to perform position detection are not necessary. Thus, the position detector can be configured with a simpler configuration, and therefore, reduction in cost of the motor driving apparatus can be achieved.

Embodiment 2

Figure 19:
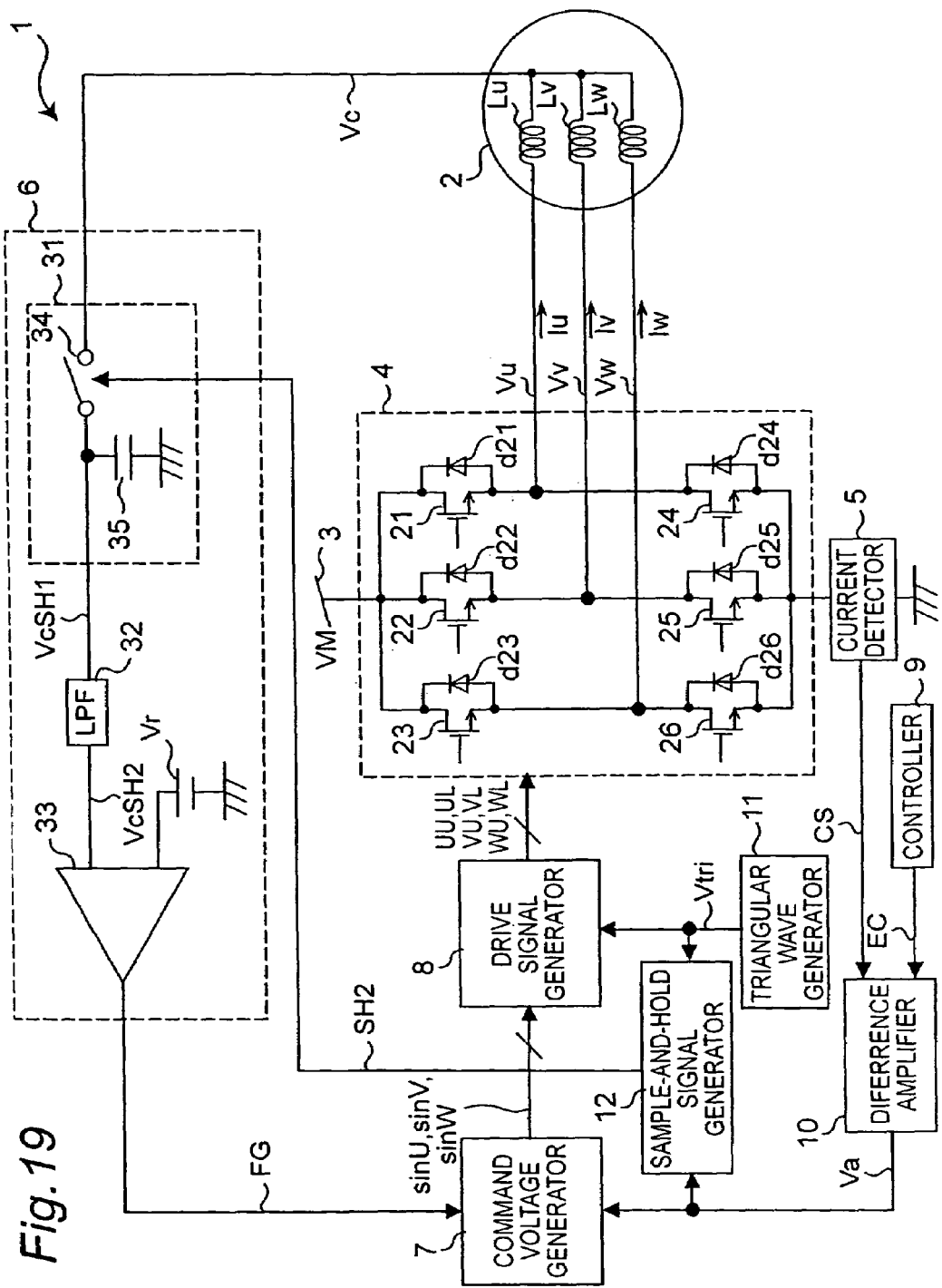
FIG. 19 is a circuit diagram of the entire configuration of a motor driving apparatus 1 according to an embodiment 2 of the present invention.

It will be described about a motor driving apparatus and a motor driving method according to an embodiment 2 using FIGS. 19 to 22. Specially, it will be described about modifications of the sample-and-hold signal generator 12 and the method for generating the sample-and-hold signal. FIG. 19 shows a circuit diagram of the entire configuration of the motor driving apparatus 1 according to the embodiment 2 of the present invention. It differs from the motor driving apparatus 1 according to the embodiment 1 in the internal configuration of the sample-and-hold signal generator 12. Other configurations and operations are similar to those explained in embodiment 1, and thus the explanations thereof are omitted.

Figure 20:
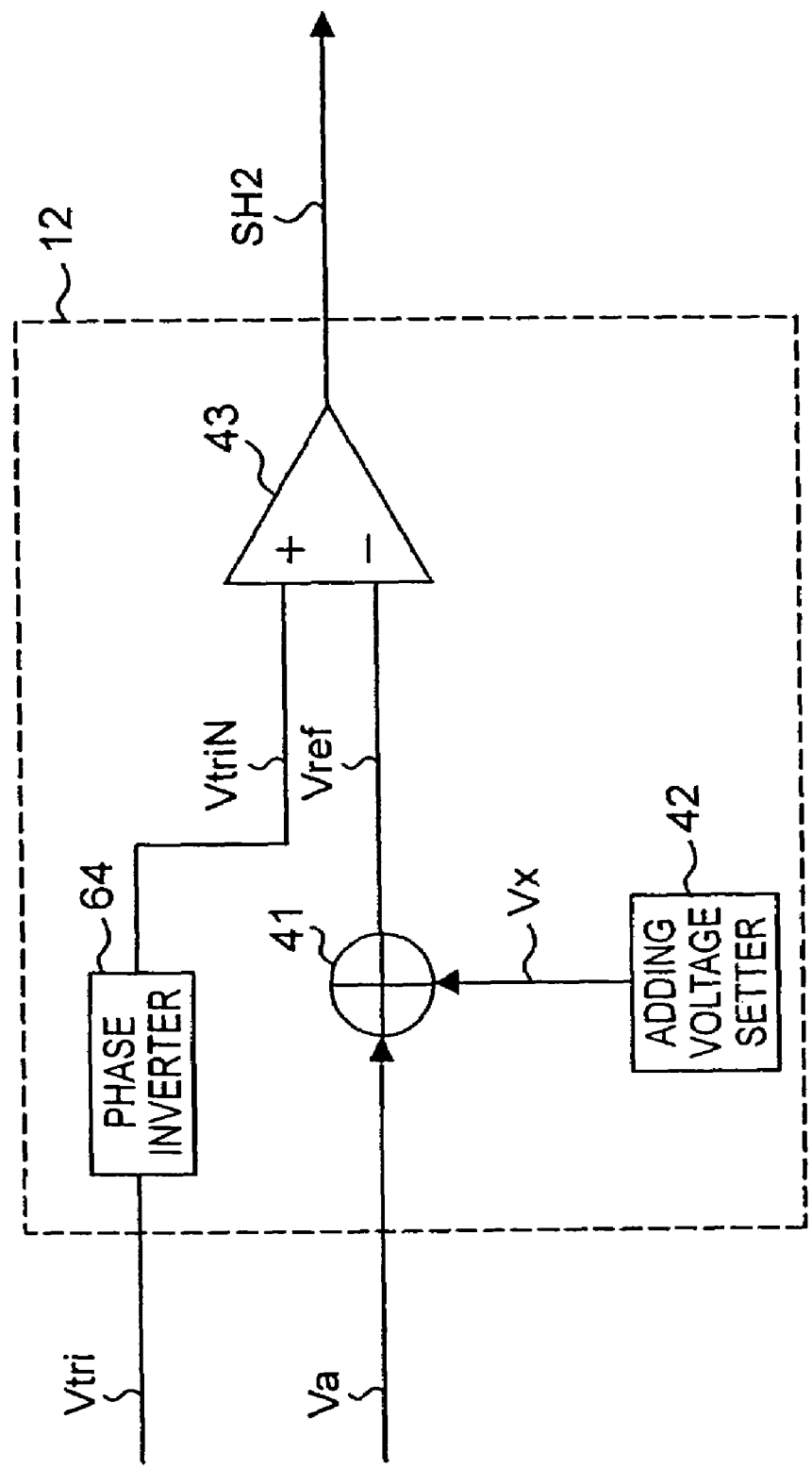
FIG. 20 is a circuit diagram of a specific configuration example of a sample-and-hold signal generator 12 shown in FIG. 19.
Figure 21:
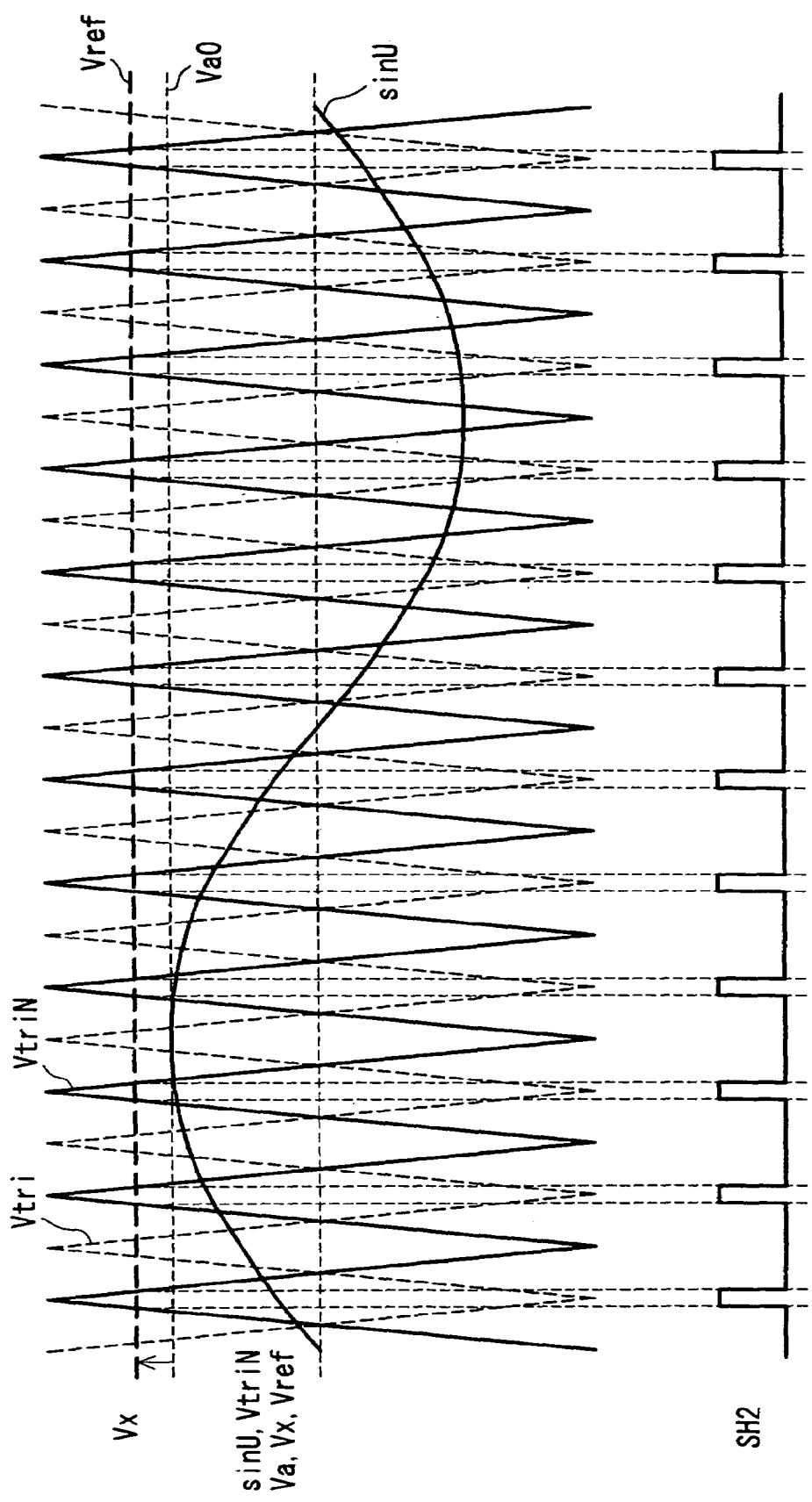
FIG. 21 is an example of the timing chart of an operation of each component of the sample-and-hold signal generator 12.

The sample-and-hold signal generator 12 generates a timing pulse indicating a period for which transistors 21 to 23 constituting the upper side arm of the motor driver 4 are in an on state, and outputs it to the position detector 6 as a sample-and-hold signal SH2. FIG. 20 shows a circuit diagram of a specific configuration example of the sample-and-hold signal generator 12. This differs from the sample-and-hold signal generator 12 of the motor driving apparatus 1 according to embodiment 1 in that a phase inverter 64 is newly arranged. The amplified signal Va and the triangular signal Vtri are input to the sample-and-hold signal generator 12. The phase inverter 64 inverts a phase of the triangular wave signal Vtri by 180 degrees, and outputs a result of the inversion as an inverted triangular wave signal VtriN. The adder 41 adds the adding voltage Vx set by the adding voltage setter 42 to the voltage of the amplified signal Va. The output voltage Vref of the adder 41 is input to the inverted input terminal of the comparator 43, and the inverted triangular wave signal VtriN is input to the non-inverted input terminal thereof. The comparator 43 compares the voltage of the inverted triangular wave signal VtriN with the voltage Vref, and outputs a result of the comparison to the position detector 6 as the sample-and-hold signal SH2. FIG. 21 shows an example of the timing chart of an operation of each component of the sample-and-hold signal generator 12. FIG. 21 shows a relationship among the U-phase command voltage sinU, the inverted triangular wave signal VtriN, the amplified signal Va, the output voltage Vref of the adder 41, and the sample-and-hold signal SH2. The operation of the sample-and-hold signal generator 12 in this case is similar to the operation explained in embodiment 1, and thus the explanation thereof is omitted. According to this configuration, it is possible to obtain the period in which the power transistors 21 to 23 constituting the upper side arm of the motor driver 4 are in an on state. The sample-and-hold signal generator 12 is not limited to the above configuration, and various modifications may be made as long as the timing pulse indicating a period for which the power transistors 21 to 23 are in an on state is generated. Other various modifications may be made without departing from the purpose of the present invention, and such modifications are, needless to say, encompassed in the present invention.

Figure 22:
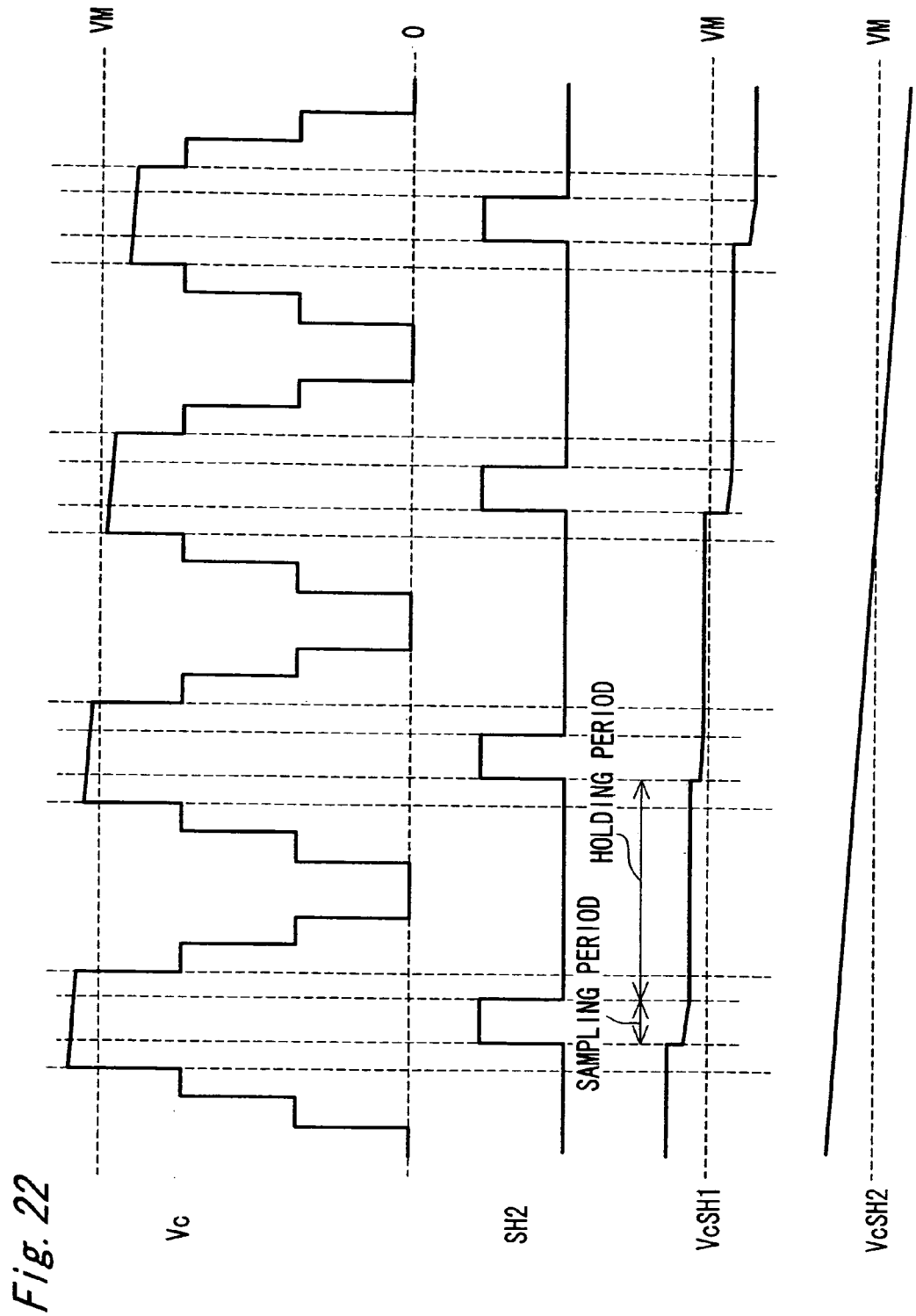
FIG. 22 is a timing chart of the operation of each component of the position detector 6.

The sample-and-hold circuit 31 of the position detector 6 samples and holds the neutral voltage Vc of the motor 2 based on the sample-and-hold signal SH2. FIG. 22 shows a timing chart of the operation of each component of the position detector 6. Here, FIG. 22 shows a relationship among the neutral voltage Vc of the motor 2, the sample-and-hold signal SH2, the sample-and-hold output signal VcSH1 output from the sample-and-hold circuit 31, and the output signal VcSH2 of the LPF 32. The waveform chart of the neutral voltage Vc as shown in FIG. 22 particularly illustrates the vicinity of the voltage of the power source 3 (VM) in detail compared to the waveform chart of the neutral voltage Vc as shown in FIG. 4. The switch 34 opens and closes based on the sample-and-hold signal SH2. When the signal level of the sample-and-hold signal SH2 is at "H" level, the switch 34 closes to be in a short-circuit state, and the neutral voltage Vc of the motor 2 is detected by the capacitor 35 (sampling operation). Next, when the signal level of the sample-and-hold signal SH2 is at "L" level, the switch 34 opens to be in an opened state, the sampled voltage is held by the capacitor 35 (holding operation). The sample-and-hold circuit 31 thus performs sampling and holding operations of the neutral voltage Vc based on the sample-and-hold signal SH2, and outputs a result of the sampling-and-holding as the sample-and-hold output signal VcSH1. The sample-and-hold output signal VcSH1 is input to the LPF 32. The LPF 32 removes the step difference in the sample-and-hold output signal VcSH1, and outputs the signal VcSH2 in which the step difference is removed to the comparator 33.

The sample-and-hold output signal VcSH1 obtained by sampling and holding the neutral voltage Vc of the motor 2 for a period in which all of the power transistors 21 to 23 constituting the upper side arm of the motor driver 4 are in an on state, has a voltage superimposed with the 3Nth harmonic component (N is an integer) contained in each phase induced voltage. The voltage value of the sample-and-hold output signal VcSH1 is with a center of the voltage value (VM) of the power source 3. If the harmonic components of $N \geq 2$ are extremely small, only the third harmonic component contained in the induced voltage is detected, similar to the embodiment 1.

The sample-and-hold output signal VcSH1 is input to one of the input terminals of the comparator 33 via the LPF 32, and the reference voltage Vr is applied to the other input terminal of the comparator 33. Since the reference voltage is set as Vr=VM (the voltage value of power source 3) in the present embodiment, the comparator 33 outputs a pulse signal having an edge at the zero cross point of each phase induced voltage. By using this signal, the magnetic pole position of the rotor can be detected at an interval of electrical angle of 60 degrees.

In the motor driving apparatus 1 according to the embodiment 2, the magnetic pole position of the rotor is detected by sampling and holding the neutral voltage Vc for a period in which all of the power transistor 21 to 23 constituting the upper side arm of the motor driver 4 are in an on state, to perform the sensorless drive. Therefore, the motor driving apparatus according to the embodiment 1 detects the zero cross point of each of the three phase induced voltages without needing the non-conducting period for detecting the magnetic pole position of the rotor, as opposed to the conventional motor driving apparatus which detects the zero cross point of each of the three phase induced voltages by comparing each phase terminal voltage with the neutral voltage of the motor 2 in the non-conducting period in which the driving current is 0, to perform the sensorless drive. That is, according to the motor driving apparatus according to the embodiment 1, it is possible to realize a substantially sinusoidal wave sensorless drive with reduced vibration and acoustic noise caused by the presence of the non-conducting period. Further, the position detector 6 of the motor driving apparatus 1 samples and holds only the neutral voltage Vc of the motor 2. Thus, as opposed to the conventional motor driving apparatus in which all of the terminal voltages are sampled and held, the sample-and-hold circuit or a switch selecting circuit for selecting one terminal voltage of the non-conduction phase to perform position detection are not necessary. Thus, the position detector can be configured with a simpler configuration, and therefore, reduction in cost of the motor driving apparatus can be achieved.

Embodiment 3

Figure 23:
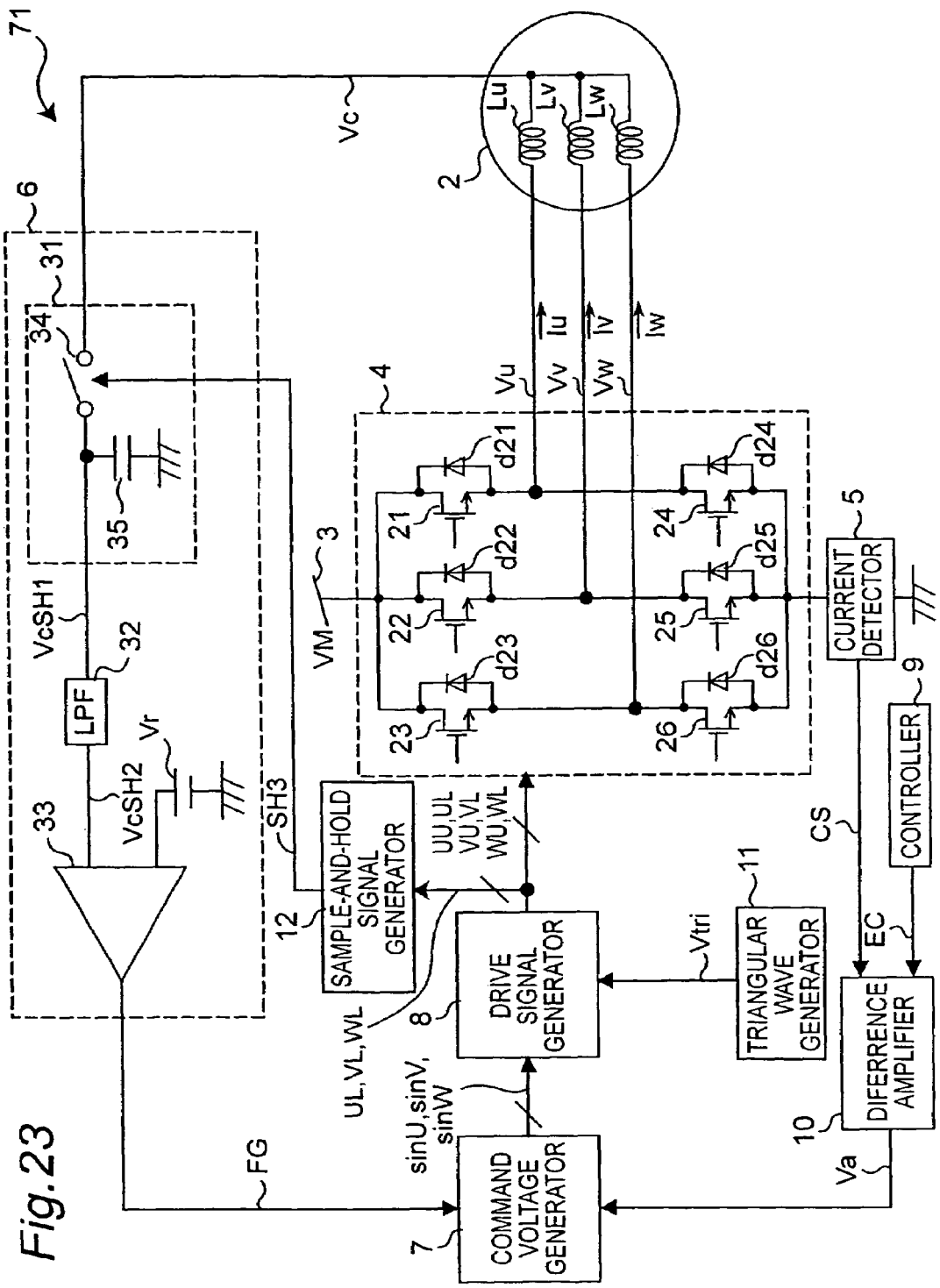
FIG. 23 is a circuit diagram of an entire configuration example of a motor driving apparatus according to an embodiment 3 of the present invention.
Figure 24:
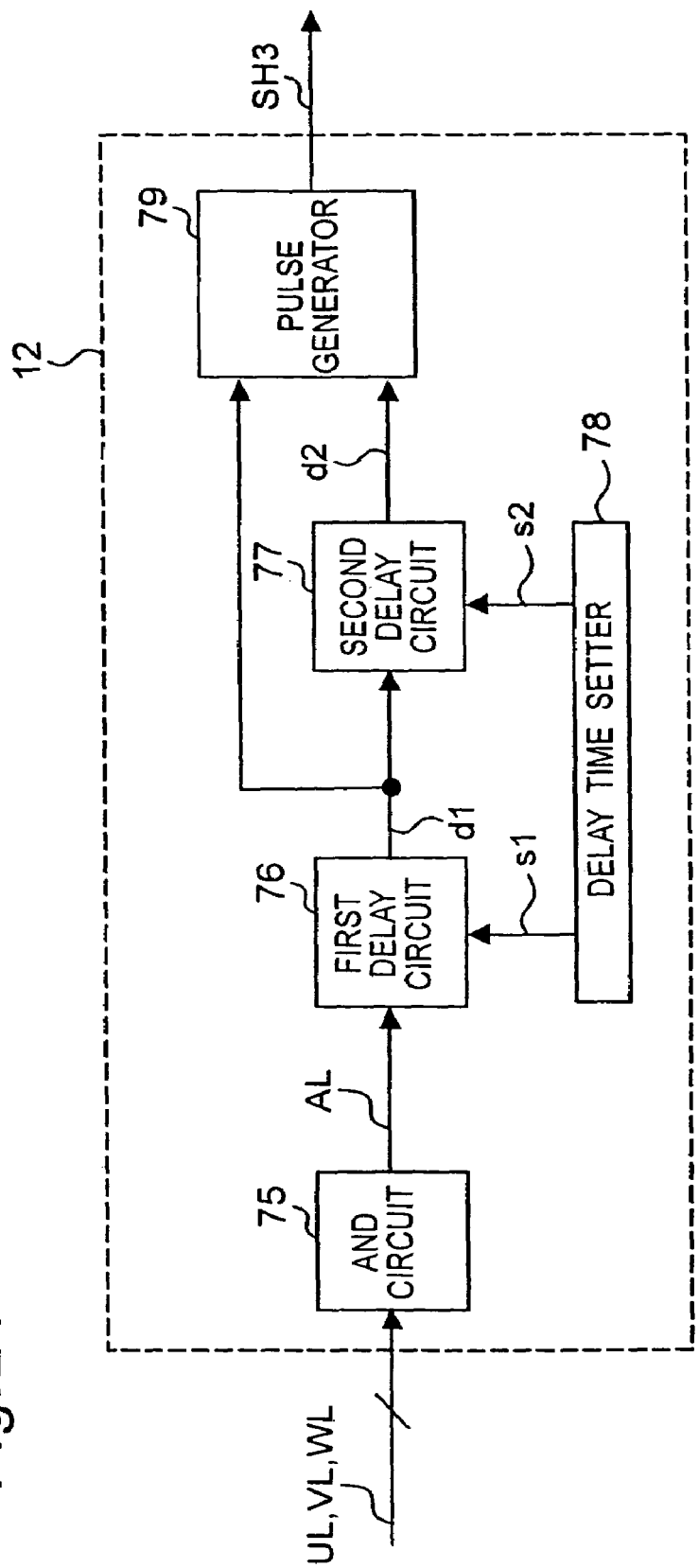
FIG. 24 is a block diagram of a specific configuration example of a sample-and-hold signal generator 12 shown in FIG. 23.
Figure 25:
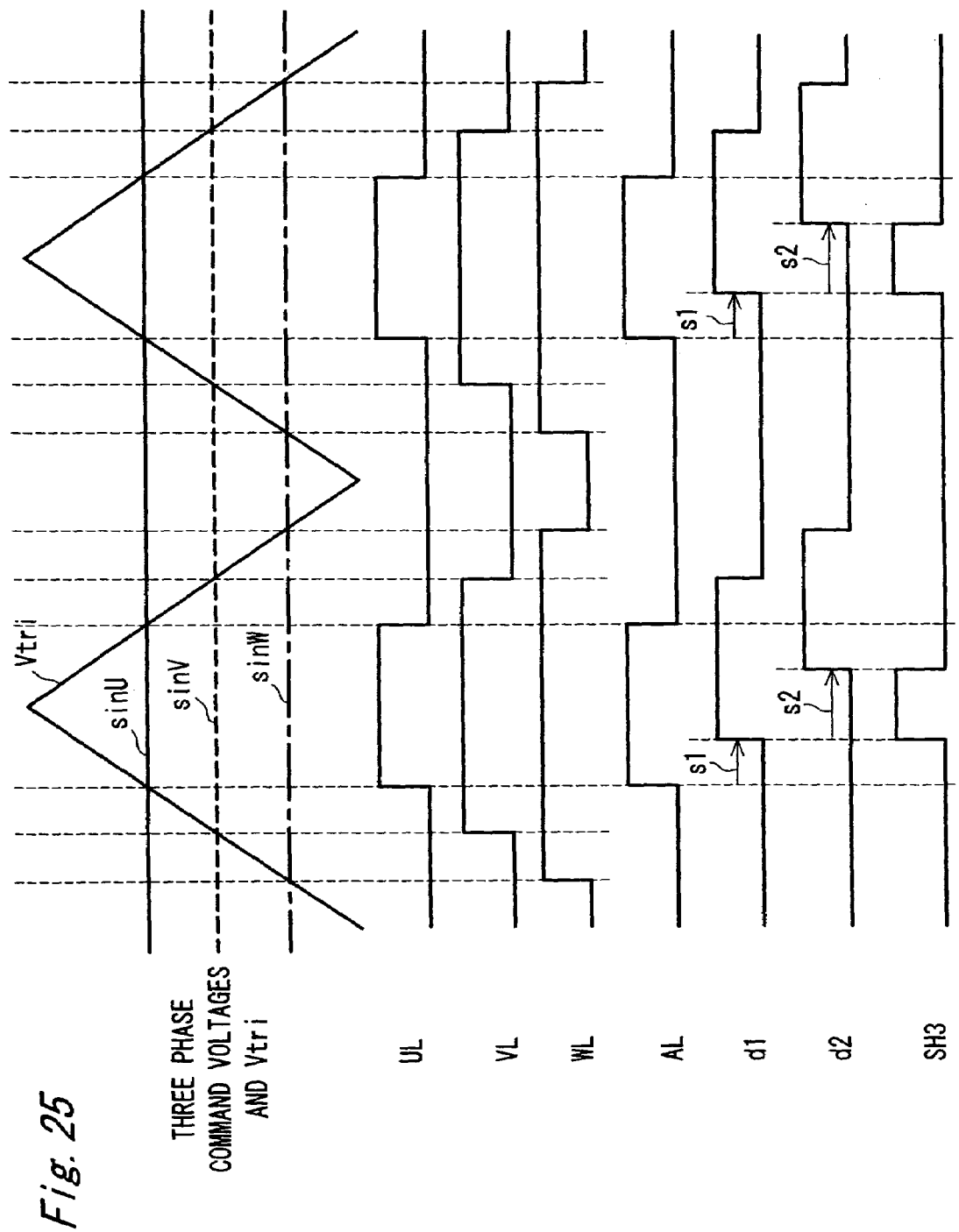
FIG. 25 is a timing chart of an operation of each component of the sample-and-hold signal generator 12.

It will be described about motor driving apparatus and method according to an embodiment 3 of the present invention with reference to FIGS. 23 to 25. It will be described about further variants of the sample-and-hold signal generator 12 and the method for generating the sample-and-hold signal. FIG. 23 is a circuit diagram of the entire configuration example of the motor driving apparatus according to the embodiment 3 of the present invention. The motor driving apparatus 71 according to this embodiment differs from the motor driving apparatus according to the embodiment 1 in the method for generating a sample-and-hold signal SH3, the arrangement of the sample-and-hold signal generator 12, and the internal configuration of the sample-and-hold signal generator 12. Other configurations and operations are the same as those explained in the embodiment 1, and thus the explanations thereof are omitted.

As shown in FIG. 23, the sample-and-hold signal generator 12 receives the lower side drive signals UL, VL, WL generated by the drive signal generator 8, and generates the sample-and-hold signal SH3. FIG. 24 is a block diagram of a specific configuration example of the sample-and-hold signal generator 12. As shown in FIG. 24, the sample-and-hold signal generator 12 includes an AND circuit 75, a first delay circuit 76, a second delay circuit 77, a delay time setter 78, and a pulse generator 79. FIG. 25 is a timing chart of an operation of each component of the sample-and-hold signal generator 12. FIG. 25 shows a relationship among the three phase command voltages sinU, sinV, sinW, the triangular wave signal Vtri, the U-phase lower side drive signal UL, the V-phase lower side drive signal VL, the W-phase lower side drive signal WL, the output signal AL of the AND circuit 75, the output signal d1 of the first delay circuit 76, the output signal d2 of the second delay circuit 77, and the sample-and-hold signal SH3. The drive signal generator 8 performed PWM on the three phase command voltages sinU, sinV, sinW output from the command voltage generator 7 with PWM with the triangular wave signal Vtri to generate the lower side drive signals UL, VL, WL. Each of the lower side drive signals UL, UV, UW is a drive signal with which the corresponding one of the power transistors 24 to 26 is turned on while it is at "H" level. The lower side drive signals UL, VL, WL are input to the AND circuit 75. The AND circuit 75 performs the logic operation AND on each input signal, and then outputs a result of the logic operation AND. Specifically, the AND circuit 75 outputs the signal of H level when the lower side drive signals UL, UV, UW are all at H level, and outputs the signal of L level when at least one of the lower side drive signals UL, UV, UW is at L level. Therefore, the signal AL obtained through the logic operation AND represents a period for which all of the power transistors 24 to 26 constituting the lower side arm of the motor driver 4 are in an on state. The first delay circuit 76 receives the signal AL. The first delay circuit 76 delays the signal AL by a first delay time s1 set by the delay time setter 78, and outputs a result of the delaying as a first delay signal d1 to the second delay circuit 77 and the pulse generator 79. The second delay circuit 77 delays the first delay signal d1 by a second delay time s2 set by the delay time setter 78, and outputs a result of the delaying as a second delay signal d2 to the pulse generator 79. Here, the first delay time s1 and the second delay time s2 are the same, and are set by the delay time setter 78. The pulse generator 79 performs logic operation AND on the first delay signal d1 and an inverted signal of the second delay signal d2, and outputs a result of the operation to the position detector 6 as the sample-and-hold signal SH3. Specifically, while the first delay signal d1 and the inverted signal of the second delay signal d2 are both at H level, that is, when the first delay signal d1 is at H level and the second delay signal d2 is at L level, the sample-and-hold signal SH3 is at H level.

As described above, the sample-and-hold signal generator 12 defines a period in which all the power transistors 24 to 26 constituting the lower side arm of the motor driver 4 are in an on state, by using the lower side drive signals UL, VL, WL generated by the drive signal generator 8. Further, the sample-and-hold signal generator 12 controls the pulse width of the sample-and-hold signal SH3 with the first and the second delay times s1, s2 set by the delay time setter 78 to output the sample-and-hold signal SH3. The magnetic pole position of the rotor is detected by sampling and holding the neutral voltage Vc of the motor 2 based on the sample-and-hold signal SH3 generated as described above. This series of operation is the same as embodiment 1, and thus the explanation thereof is omitted. The AND circuit 75 constitutes a first on-period detector, and the pulse generator 79 constitutes a second on-period detector.

In the embodiment 3, the sample-and-hold signal SH3 is digitally generated from the lower side drive signals UL, VL, WL generated by the drive signal generator 8, the thus the sample-and-hold signal SH3 is controlled in a timing thereof at a better precision than the sample-and-hold signal SH1 explained in the embodiment 1.

In the embodiment 3, the sample-and-hold signal SH3 is generated for a period in which all of the power transistors 24 to 26 constituting the lower side arm of the motor driver 4 are in an on state, but it may be generated for a period in which all of the power transistors 21 to 23 constituting the upper side arm of the motor driver 4 are in an on state. In this case, the sample-and-hold signal generator 12 receives the upper side drive signals UU, VU, WU generated by the drive signal generator 8. Here, the value of the reference voltage Vr employed in the position detector 6 must be set to VM.

Figure 26:
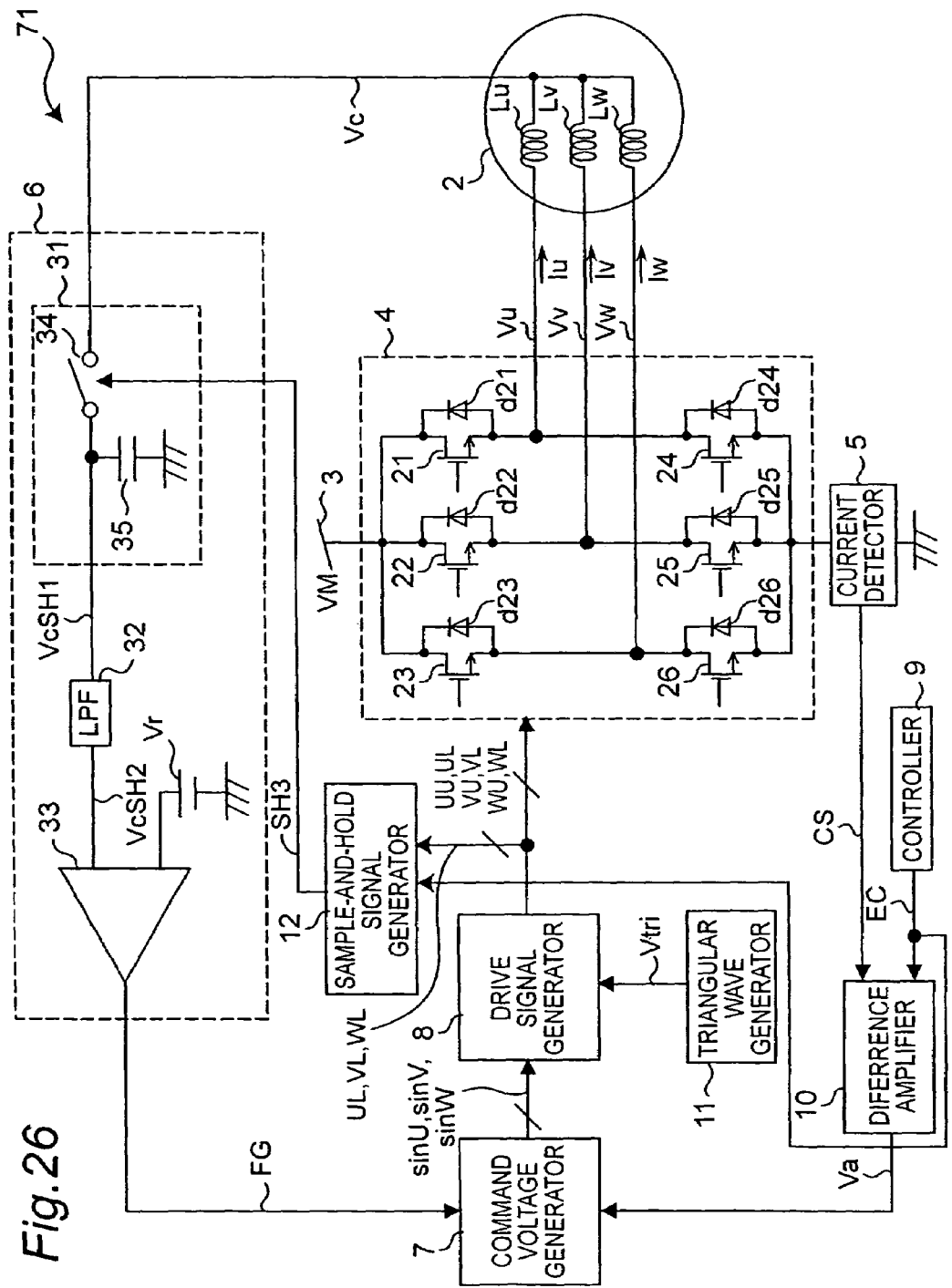
FIG. 26 is a block diagram of a configuration example of a motor driving apparatus 71 in the case that a first delay time s1 and a second delay time s2 are variable based on a torque command signal EC.
Figure 27:
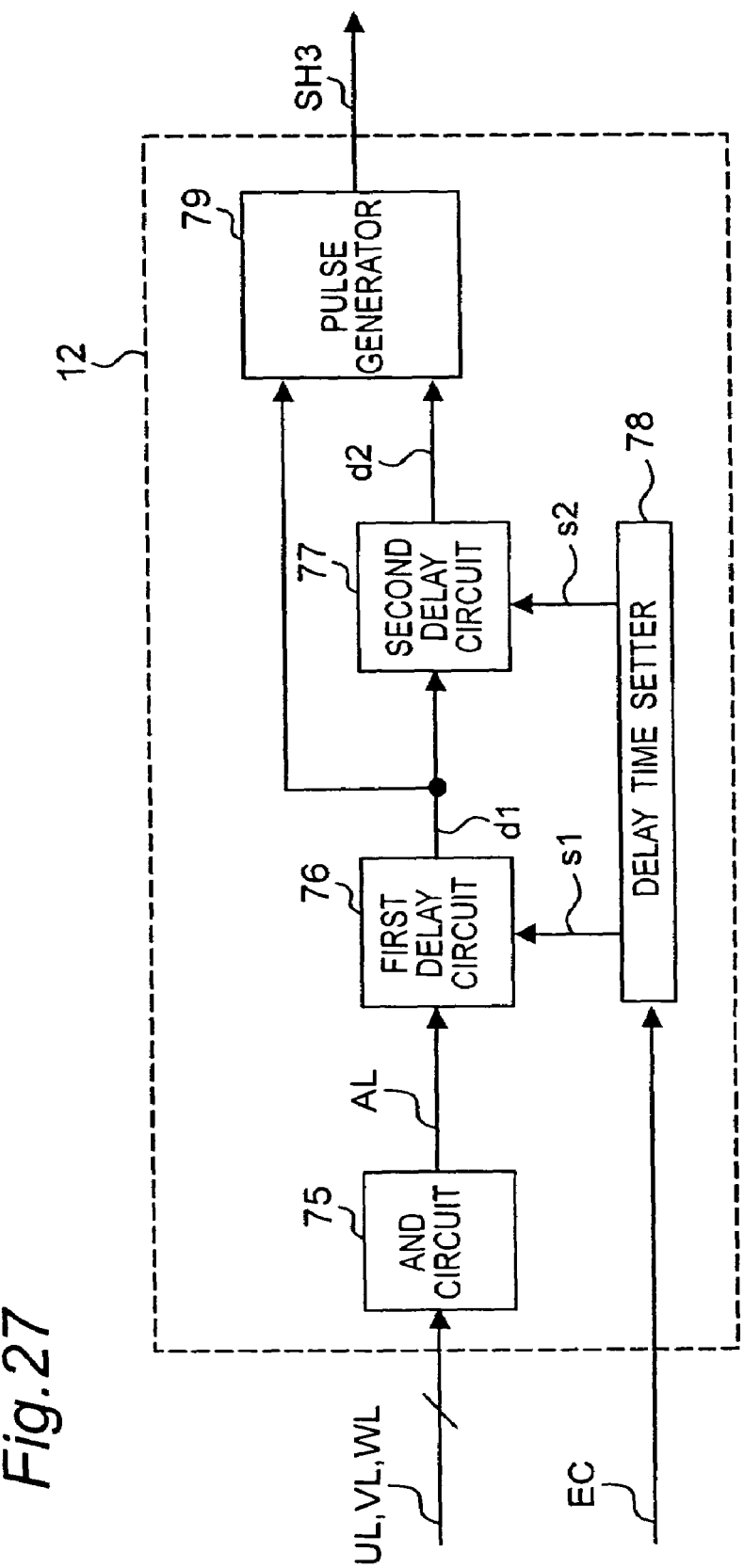
FIG. 27 is a circuit diagram of a configuration example of a sample-and-hold signal generator 12 shown in FIG. 26.

The amplitude of each of the three phase command voltages sinU, sinV, sinW generated by the command voltage generator 7 is controlled based on the amplified signal Va, and the amplified signal Va fluctuates based on the torque command signal EC from the controller 9. Thus, the pulse width of the AL signal output from the AND circuit 75, which depends on the amplitude of each of the three phase command voltages, depends on the torque command signal EC. In this case, unless the first delay time s1 and the second delay time s2 are appropriately set by the delay time setter 78, it may become impossible to define the period for which the power transistors 24 to 26 constituting the lower side arm of the motor driver 4 are in an on state. Therefore, when the first delay time s1 and the second delay time s2 set by the delay time setter 78 are variable based on the torque command signal EC, the sample-and-hold signal SH3 may be generated at a better precision. FIG. 26 is a block diagram of a configuration example of the motor driving apparatus 71 in such a case, and FIG. 27 is a circuit diagram of a configuration example of the sample-and-hold signal generator 12 shown in FIG. 26. As shown in FIGS. 26 and 27, the delay time setter 78 of the sample-and-hold signal generator 12 receives the torque command signal EC output from the controller 9 so that it can change the first delay time s1 and the second delay time s2 based on the torque command signal EC. Further, the first delay time s1 and the second delay time s2 may be set in advance in view of the assumable maximum amplitude of each of the three phase command voltages. The sample-and-hold signal generator 12 is not limited to the above, and various modifications may be made as long as it has a configuration of generating, by using the lower side drive signals UL, VL, WL generated by the drive signal generator 8, the sample-and-hold signal SH3 for a period in which the power transistors 24 to 26 constituting the lower side arm of the motor driver 4 are in an on state. Such modified configurations are, needless to say, encompassed in the present invention.

Figure 28:
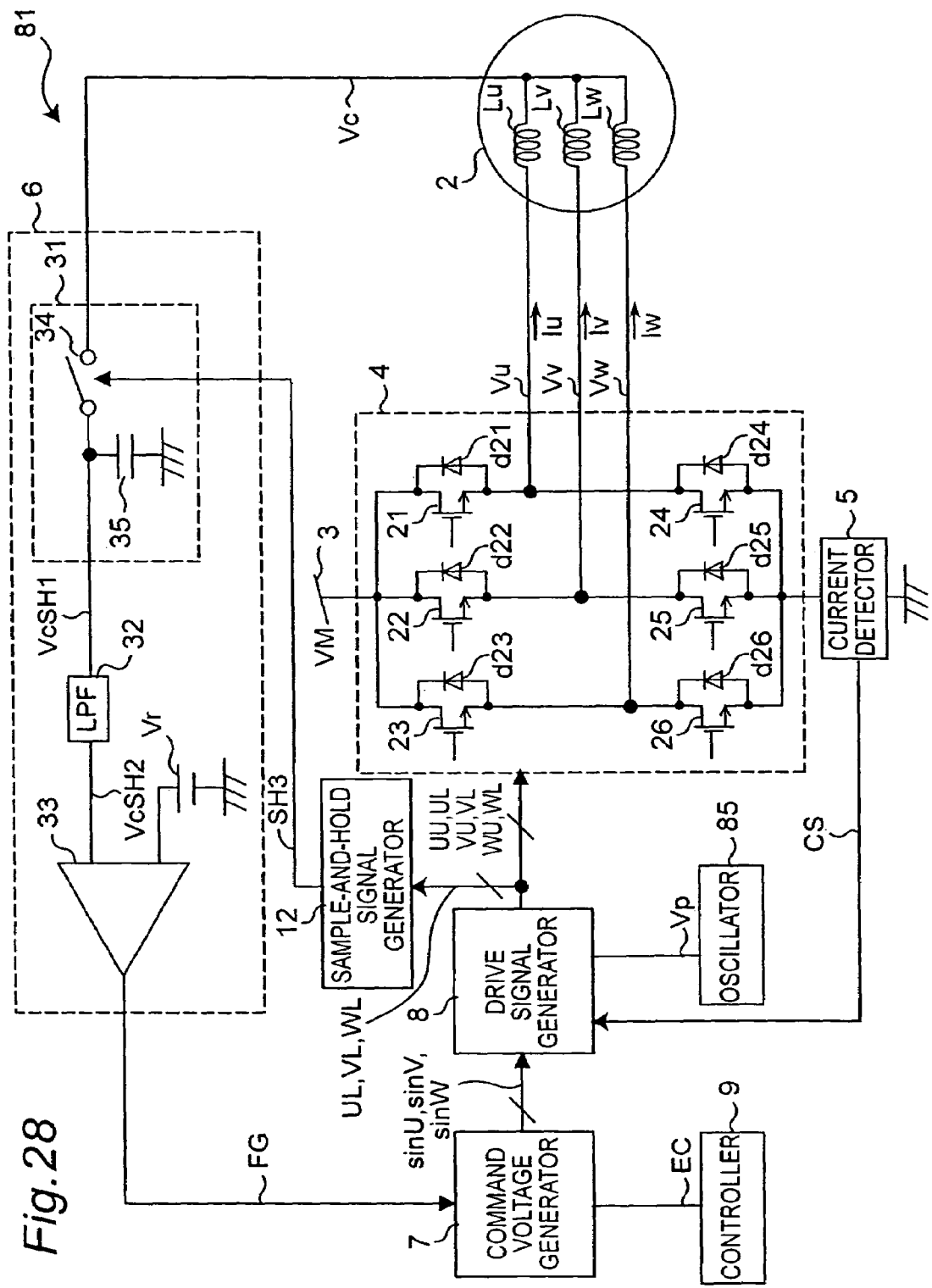
FIG. 28 is a circuit diagram of a configuration example of a motor driving apparatus using the current PWM.
Figure 29:
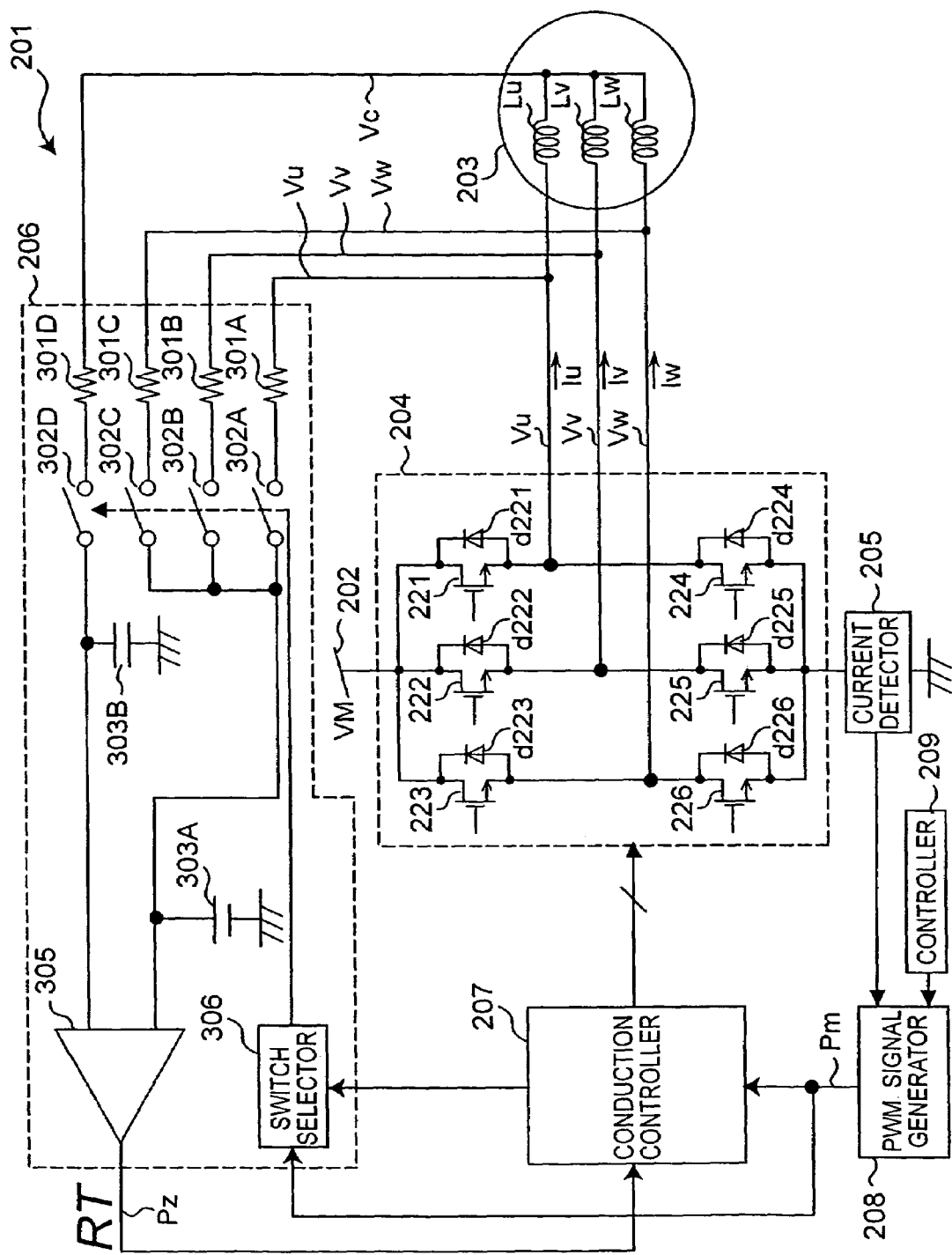
FIG. 29 is an entire configuration of a conventional motor driving apparatus.

The motor driving apparatus 71 according to the embodiment 3 compares each of the three phase command voltages with the voltage of the triangular wave signal to perform PWM drive. The motor driving apparatus 71 may, however, have a configuration in which, when the current value detected by the current detector 5 reaches a value of a maximum possible current to flow through a path of the motor driver 4, the current conduction in the path is stopped (hereinafter, referred to as "current PWM"). Here, the value of the maximum possible current to flow through a path of the motor driver 4 is represented by one of the three phase command voltages corresponding to the path. It will be described about a method for driving the motor 2 using this "current PWM". FIG. 28 is a circuit diagram of a configuration example of the motor driving apparatus which drives the motor 2 using the current PWM. The motor driving apparatus 81 shown in FIG. 28 differs from the driving device 71 shown in FIG. 23 in that the difference amplifier 10 and the triangular wave generator 11 are omitted, in that the output signal of the controller 9 is directly input to the command voltage generator 7, in that the output signal of the current detector 5 is directly input to the drive signal generator 8, and in that an oscillator 85 is added. The value of each of the three phase command voltages generated by the command voltage generator 7 indicates a value (hereinafter, referred to as "command value") of the corresponding phase current to flow in the motor driver 4 (i.e. a value of a maximum possible current of corresponding phase). When the value of the current detection signal CS reaches any one of the command values of the three phase currents, the phase current of the command value reached by the value of the current detection signal CS is stopped flowing (PWM off). The stop of the phase current is performed by turning off the transistors of the motor driver 4 in each of which the phase current flows. The oscillator 85 operates to PWM on the motor driver 4 at a predetermined period, so that each of the three phase currents is controlled based on the corresponding command value (current PWM). Thus, each of the three phase currents has a waveform whose peak value is controlled by the corresponding command value. The drive signal generator 8 generates the drive signals UU etc. with which the power transistors 21 to 26 of the motor driver 4 are controlled to perform the above operation. This is specifically illustrated as below. Assume the current flows from the U-phase to the V-phase and the W-phase. When the value of the U-phase current reaches the command value of the U-phase current, the U-phase upper side power transistor 21 is turned off (PWM off: stop the current flow of the path in which the U-phase current flows). Thereafter, the U-phase upper side power transistor 21 is again turned on at a timing synchronous with a predetermined frequency of the oscillation signal Vp generated by the oscillator 85. Therefore, by repeating the operations of turning off the U-phase upper side power transistor 21 when the U-phase current reaches the current command value of the U-phase current and turning on the turned-off U-phase upper side power transistor 21 at a timing synchronous with the predetermined oscillating frequency of the oscillation signal Vp, the peak value of the U-phase current is controlled by the command value of the U-phase current so as to be substantially constant. Similar operations are performed for the V-phase and the W-phase.

The motor driving apparatus and method according to the present invention achieve the magnetic pole position detection of the rotor that does not require non-conducting period with a simple configuration, and have an advantage of performing a substantially sinusoidal wave sensorless drive with vibration and acoustic noise caused by the presence of the non-conducting period reduced. The motor driving apparatus and method according to the present invention is effective as a motor driving apparatus and driving method etc. for performing sensorless drive.

It will be obvious to those having skill in the art that many changes may be made in the above-described details of the preferred embodiments of the present invention. The scope of the present invention, therefore, should be determined by the following claims.

What is claimed is:

1. A motor driving apparatus driving a multiphase motor comprising:
    a motor driver which includes a parallel circuit in which a plurality of series circuits are connected in parallel, each of the plurality of series circuits having a high side switching device and a low side switching device connected in series;
    a voltage detector which detects a voltage at a neutral point of the multiphase motor during a first period and outputs the detected voltage as a first detection signal, the first period being identical to or a part of a period for which all of the high side switching devices or/and all of the low side switching devices are in an on state in the parallel circuit;
    a first timing detector which detects a timing at which a voltage of the first detection signal equals to a first reference voltage, and outputs the detected timing as a second detection signal;
    a periodic signal generator which generates a periodic signal whose phase is controlled based on the second detection signal; and
    a driving signal generator which generates, by using the periodic signal, a plurality of driving signals with each of which one of the high side and low side switching devices in the parallel circuit is driven.

2. The motor driving apparatus according to claim 1, wherein said periodic signal generator generates a sinusoidal wave signal.

3. The motor driving apparatus according to claim 1, wherein said voltage detector comprises:
    a neutral voltage detector which detects the voltage at the neutral point of the multiphase motor during the first period and outputs the detected voltage as a third detection signal; and
    a filter which extracts only a predetermined frequency band of the third detection signal and outputs a signal of the extracted frequency band as the first detection signal.

4. The motor driving apparatus according to claim 1, wherein said first timing detector comprises a comparator which compares the voltage of the first detection signal with the first reference voltage, and outputs a result of the comparison as the second detection signal.

5. The motor driving apparatus according to claim 1, wherein said voltage detector comprises:
    a neutral voltage detector which detects the voltage at the neutral point of the multiphase motor during the first period and outputs the detected voltage as a third detection signal; and
    a filter which extracts only a predetermined frequency band of the third detection signal and outputs a signal of the extracted frequency band as the first detection signal,
    wherein said first timing detector comprises,
    a rate detector which detects a rate of change of the first detection signal and outputs the detected rate as a fourth detection signal, and
    a comparator which compares a voltage of the forth detection signal with a second reference voltage, and outputs a result of the comparison as the second detection signal.

6. The motor driving apparatus according to claim 1, wherein said voltage detector comprises:
- a neutral voltage detector which detects the voltage at the neutral point of the multiphase motor during the first period and output the detected voltage as a third detection signal; and
- an amplifier which amplifies the third detection signal and output an amplified signal as the first detection signal.

7. The motor driving apparatus according to claim 1, wherein said voltage detector comprises a sample-and-hold unit which samples and holds the voltage at the neutral point of the multiphase motor during the first period and outputs a sampled-and-held voltage as the first detection signal.

8. The motor driving apparatus according to claim 7, wherein said voltage detector further comprises a carrier wave generator which generates a carrier wave,
- said periodic signal generator generates a plurality of periodic signals each of which corresponds to one phase of the multiphase motor,
- said sample-and-hold unit samples and holds the voltage at the neutral point of the multiphase motor, during a period, corresponding to the first period, for which a voltage of the carrier wave is larger than a voltage of each of the plurality of periodic signals, and
- said driving signal generator generates the plurality of driving signals by modulating the plurality of periodic signals with the carrier wave.

9. The motor driving apparatus according to claim 8, wherein said periodic signal generator comprises:
- a current detector which detects a current flowing in the whole parallel circuit and outputs a value of the detected current as a current detection signal; and
- a difference amplifier which amplifies a difference between a voltage of the current detection signal and a third reference voltage, and outputs the amplified difference,
- wherein said periodic signal generator generates the plurality of periodic signals each of which has an amplitude corresponding to a voltage of the amplified difference.

10. The motor driving apparatus according to claim 9, wherein said periodic signal generator generates the plurality of periodic signals each of which has an amplitude equal to the voltage of the amplified difference, and
- said sample-and-hold unit samples and holds the voltage at the neutral point of the multiphase motor, during a period, corresponding to the first period, for which the voltage of the carrier wave is larger than that of the amplified difference.

11. The motor driving apparatus according to claim 10, wherein said sample-and-hold unit comprises an adder which adds the voltage of the amplified difference and a predetermined positive voltage, and outputs a result of the addition as an addition voltage,
- wherein said sample-and-hold unit samples and holds the voltage at the neutral point of the multiphase motor during a period, corresponding to the first period, for which the voltage of the carrier wave is larger than the addition voltage, and outputs a sampled-and-held voltage as the first detection signal.

12. The motor driving apparatus according to claim 11, wherein said sample-and-hold unit further comprises a phase inverter which inverts a phase of the carrier wave and outputs the carrier wave with the inverted phase,
- wherein said sample-and-hold unit samples and holds the voltage at the neutral point of the multiphase motor, during a period, corresponding to the first period, for which a voltage of the carrier wave with the inverted phase is larger than the addition voltage.

13. The motor driving circuit according to claim 7, wherein said sample-and-hold unit comprises a first on-period detector which detects, from the plurality of driving signals generated by said driving signal generator, the period for which all of the high side switching devices or/and all of the low side switching devices are in an on state in the parallel circuit as a first on-period, and outputs the detected first on-period as a first on-period detection signal, and
- wherein said sample-and-hold unit samples and holds the voltage at the neutral point of the multiphase motor during the first period and outputs the sampled-and-held voltage as the first detection signal, the first period being identical to or a part of the first on-period.

14. The motor driving circuit according to claim 13, wherein said first on-period detector outputs the first on-period detection signal which is a binary signal whose level is different between the first on-period and the other period,
- said sample-and-hold unit further comprises:
- a first delay circuit which delays the first on-period detection signal by a first delay time, and outputs the delayed signal as a first delay signal;
- a second delay circuit which delays the first delay signal by a second delay time, and outputs the delayed signal as a second delay signal; and
- a second on-period detector which detects, by using the first and second delay signals, the second delay time after a time when a level of the first delay signal changes in a predetermined manner as the first period;
- wherein said sample-and-hold unit samples and holds the voltage at the neutral point of the multiphase motor during the first period and outputs the sampled-and-held voltage as the first detection signal.

15. The motor driving apparatus according to claim 1, further comprising:
- a current detector which detects a current flowing in the whole parallel circuit and outputs a value of the detected current as a current detection signal; and
- an oscillator which outputs an oscillation signal of a predetermined frequency;
- wherein said motor driver includes the plurality of series circuits each of which corresponds to one phase of the multiphase motor,
- said periodic signal generator generates the plurality of periodic signals each of which corresponds to one phase of the multiphase motor, each of the plurality of periodic signals indicating a value of a maximum possible current to flow in the high side switching device or the low side switching device of the series circuit corresponding to one phase of the multiphase motor, and
- said driving signal generator generates the plurality of driving signals to turn off the high side and low side switching devices in each of which a current indicated by the current detection signal flows, when the current is larger than the maximum possible current indicated by a corresponding periodic signal, and then turn on the turned-off switching devices at a timing synchronous with the predetermined frequency of the oscillation signal.

16. The motor driving apparatus according to claim 15, wherein said voltage detector comprises a sample-and-hold unit which samples and holds the voltage at the neutral point of the multiphase motor during the first period, and outputs the sampled and held voltage as the first detection signal.

17. The motor driving apparatus according to claim 1, further comprising a second timing detector, wherein
said motor driver includes the plurality of series circuits, each of which having a connection point at which the high side and low side switching devices are connected,
said second timing detector detects a timing of a zero cross point of at least one of induced voltages at the connection points during a free-run period, and outputs a detected timing as a timing signal, the free-run period being for which all of the high side and low side switching devices are in an off state in the parallel circuit, and
said periodic signal generator generates a periodic signal whose phase is controlled based on the second detection signal and the timing signal.

18. The motor driving apparatus according to claim 17, wherein said second timing detector detects a timing at which the voltage of the connection point corresponding to said at least one of the induced voltages equals to the voltage at the neutral point of the multiphase motor as the timing of the zero cross point.

19. The motor driving apparatus according to claim 17, further comprising a carrier wave generator which generates a carrier wave, wherein said driving signal generator comprises,
a forcible periodic signal generator which generates a forcible periodic signal whose frequency is constant or changes at a predetermined rate,
a first selector which selects one between the forcible periodic signal and the periodic signal generated by said periodic signal generator,
a first generator which modulates the forcible periodic signal or the periodic signal selected by said first selector with the carrier wave to generate a plurality of first driving signals,
a second generator which generates a plurality of second driving signals with which all of the high side and low side switching devices are turned off,
a second selector which selects the first driving signals or the second driving signals,
a selection controller which controls operations of said first and second selectors,
wherein said second timing detector detects the timing of the zero cross point while said second selector selects the second driving signals.

20. The motor driving apparatus according to claim 19, wherein said selection controller controls the operations of said first and second selectors based on the length of time from starting.

21. The motor driving apparatus according to claim 19, wherein said selection controller controls the operations of said first and second selectors based on a rotation speed of the multiphase motor.

22. A magnetic pole position detector for detecting a magnetic pole position of a multiphase motor by detecting a timing at which a voltage at a neutral point of the multiphase motor equals to a reference voltage, the magnetic pole position detector comprising:
a motor driver which includes a parallel circuit in which a plurality of series circuits are connected in parallel, each of the plurality of series circuits having a high side switching device and a low side switching device connected in series;
a voltage detector which detects the voltage at the neutral point of the multiphase motor during a period, and output a detected voltage as a detection signal, the period being identical to or a part of a period for which all of the high side switching devices or/and all of the low side switching devices are in an on state in the parallel circuit; and
a timing detector which detects a timing at which a voltage of the detection signal equals to the reference voltage.

23. A method for driving a multiphase motor which comprises a motor driver including a parallel circuit in which a plurality of series circuits are connected in parallel, each of the plurality of series circuits having a high side switching device and a low side switching device connected in series, the method comprising the steps of:
detecting a voltage at a neutral point of the multiphase motor during a period, and outputs the detected voltage as a first detection signal, the period being identical to or a part of a period for which all of the high side switching devices or/and all of the low side switching devices are in an on state in the parallel circuit;
detecting a timing at which a voltage of the first detection signal equals to a reference voltage and outputs the detected timing as a second detection signal;
generating a periodic signal whose phase is controlled based on the second detection signal; and
generating, by using the periodic signal, a plurality of driving signals with each of which a corresponding one of the high side and low side switching devices of the parallel circuit is driven.

24. The method for driving a multiphase motor according to claim 23, in which said motor driver includes the plurality of series circuits each of which having a connection point at which the high side and low side switching devices are connected, the method further comprising the steps of, before the step of detecting a voltage,
forcing each of the high side and low side switching devices to be driven in the parallel circuit;
turning off all of the high side and low side switching devices in the parallel circuit;
detecting a timing of a zero cross point of at least one of induced voltages at the connection points and outputs the detected timing as a timing signal, while all of the high side and low side switching devices are in an off state in the parallel circuit; wherein the periodic signal whose phase is controlled based on the second detection signal and the timing signal is generated.

25. The method for driving a multiphase motor according to claim 24, wherein in the step of detecting a timing of the zero cross point, a timing is detected when a voltage of the connection point corresponding to said at least one of the induced voltages equals to the voltage at the neutral point of the multiphase motor, as the timing of the zero cross point.

* * * * *